US012664540B2

(12) United States Patent
Mee et al.

(10) Patent No.: US 12,664,540 B2
(45) Date of Patent: Jun. 23, 2026

(54) COMPUTER-IMPLEMENTED SYSTEM AND METHOD FOR IMPLEMENTING ALIAS-BASED ADDRESSING FOR A DISTRIBUTED LEDGER

(71) Applicant: nChain Holdings Limited, St. John's (AG)

(72) Inventors: Andy Mee, Cardiff (GB); Ryan Dickherber, San Francisco, CA (US)

(73) Assignee: NCHAIN LICENSING AG, Zug (CH)

( * ) Notice: Subject to any disclaimer, the term of this patent is extended or adjusted under 35 U.S.C. 154(b) by 430 days.

(21) Appl. No.: 17/604,388

(22) PCT Filed: Jan. 29, 2020

(86) PCT No.: PCT/IB2020/050686
§ 371 (c)(1),
(2) Date: Oct. 15, 2021

(87) PCT Pub. No.: WO2020/212766
PCT Pub. Date: Oct. 22, 2020

(65) Prior Publication Data
US 2022/0198444 A1 Jun. 23, 2022

Related U.S. Application Data

(63) Continuation of application No. 16/384,696, filed on Apr. 15, 2019, now abandoned.

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0658* (2013.01); *G06Q 20/3825* (2013.01);
(Continued)

(58) Field of Classification Search
CPC ............ G06Q 2220/00; G06Q 20/389; G06Q 20/3829; G06Q 20/3825; G06Q 20/0658; G06Q 20/3678; H04L 9/30; H04L 9/088
See application file for complete search history.

(56) References Cited

U.S. PATENT DOCUMENTS 9,971,574 B2 * 5/2018 Mathew ................... G06F 8/40
10,776,761 B2 * 9/2020 MacGregor ............. H04L 63/12
(Continued)

FOREIGN PATENT DOCUMENTS

CN 109088722 A 12/2018
WO 2017/081534 A1 5/2017
(Continued)

OTHER PUBLICATIONS

Panarello et al., "Blockchain and IoT Integration: A Systematic Survey," MDPI, Aug. 6, 2018, 38 pages.
(Continued)

*Primary Examiner* — Neha Patel
*Assistant Examiner* — Davida Lee King
(74) *Attorney, Agent, or Firm* — Tarolli, Sundheim, Covell & Tummino LLP

(57) ABSTRACT

The present disclosure provides a method of implementing a payment service for one or more clients for transactions associated with a distributed ledger, such as the Bitcoin blockchain. The method comprises providing an alias for a client, associating the alias with a network in a directory and providing a location for a host computing resource responsible for the payment service, wherein the host computing resource is configured to facilitate identification of the client associated with the alias. The present disclosure also provides a method comprising creating a machine readable resource in a location associated with the payment service, wherein the machine readable resource comprises an end-
(Continued)

102 — Assign an alias for a digital wallet

104 — Create a service record in a global directory

106 — Update the service record to indicate a payment service

108 — Update the service record to indicate a location for a host computing resource point identifier for the payment service, an entry associated with at least one capability supported by the payment service, and instructions and/or a specification for accessing a public address for facilitating transactions associated with the alias. The present disclosure also discusses a method of implementing a simplified payment protocol for clients associated with the payment service.

18 Claims, 12 Drawing Sheets

(51) Int. Cl.
  *G06Q 20/38* (2012.01)
  *H04L 9/08* (2006.01)
  *H04L 9/30* (2006.01)
(52) U.S. Cl.
  CPC ....... *G06Q 20/3829* (2013.01); *G06Q 20/389* (2013.01); *H04L 9/088* (2013.01); *H04L 9/30* (2013.01); *G06Q 2220/00* (2013.01)

(56) References Cited

U.S. PATENT DOCUMENTS

| | | | |
|---|---|---|---|
| 2003/0161335 A1 | 8/2003 | Fransdonk | |
| 2008/0154772 A1 | 6/2008 | Carlson | |
| 2015/0269539 A1 | 9/2015 | MacGregor et al. | |
| 2016/0055322 A1* | 2/2016 | Thomas | H04L 63/0876 |
| | | | 726/7 |
| 2016/0364721 A1* | 12/2016 | Deliwala | G06Q 20/36 |
| 2017/0132630 A1 | 5/2017 | Castinado et al. | |
| 2017/0161843 A1 | 6/2017 | Rizzini | |
| 2017/0237726 A1 | 8/2017 | Wang | |
| 2018/0053182 A1 | 2/2018 | Mokhasi | |
| 2018/0295135 A1* | 10/2018 | Feijoo | H04L 63/10 |
| 2019/0057362 A1 | 2/2019 | Wright et al. | |
| 2019/0095879 A1 | 3/2019 | Eyal et al. | |
| 2019/0104102 A1 | 4/2019 | Khan et al. | |
| 2021/0112063 A1* | 4/2021 | Castinado | G06Q 20/385 |

FOREIGN PATENT DOCUMENTS

| | | | | |
|---|---|---|---|---|
| WO | 2018039722 A1 | 3/2018 | | |
| WO | 2018121797 A1 | 7/2018 | | |
| WO | WO-2019015382 A1 * | 1/2019 | | H04L 61/30 |

OTHER PUBLICATIONS

International Search Report and Written Opinion for Application No. PCT/IB2020/052935, mailed Mar. 27, 2020, filed May 29, 2020, 17 pages.
UK IPO Search Report mailed Oct. 31, 2019, Patent Application No. GB1907180.2, 6 pages.
Antonopoulos, "Mastering Bitcoin—Unlocking Digital Cryptocurrencies," O'Reilly Media, Inc., Dec. 20, 2014, 282 pages.
International Search Report and Written Opinion for Application No. PCT/IB2020/050686, mailed Mar. 26, 2020, filed Jan. 29, 2020, 8 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
Zima, "Sending Money like Sending E-mails: Cryptoaddresses, The Universal Decentralised Identities," Dec. 15, 2016, 9 pages.
Korean Intellectual Property Office, "Request for the Submission of an Opinion" in Application No. 10-2021-7036962, May 21, 2024, 9 pages.
CN Office Action for corresponding CN Patent Application No. 202080029280.2, issued Jul. 23, 2025, 24 pages.

\* cited by examiner

202a  Receive a request for a transaction associated with an alias

204a  Locate a service record for the payment service related to the alias

206a  Obtain the location of a host computing resource for the payment service

208a  Determine a public address of an entity associated with the alias

Send a request for a transaction associated with an alias

202b

Obtain a location of a host computing resource for a payment service, based on a service record 206b Determine a public address of an entity associated with the alias 208b 402  Obtain a PKI request template from a machine readable resource 404  Generate a complete PKI request based on an alias 406  Provide a HTTP GET request based on the complete PKI request 408  Obtain a public key associated with the alias 502b　Access a machine readable resource 504b　Obtain a payment destination endpoint identifier 506b　Send payment details for a transaction 508b　Provide a digital signature 510b　Verified?　N　Y 512b　Receive an output script associated with the payment destination endpoint identifier 514b　Embed the output script in a transaction Obtain a payment destination request template from a machine-readable resource

602

Generate a complete payment destination request based on an alias

604

Provide a HTTP POST request based on the complete payment destination request

606

Obtain a payment destination endpoint identifier associated with the alias

608

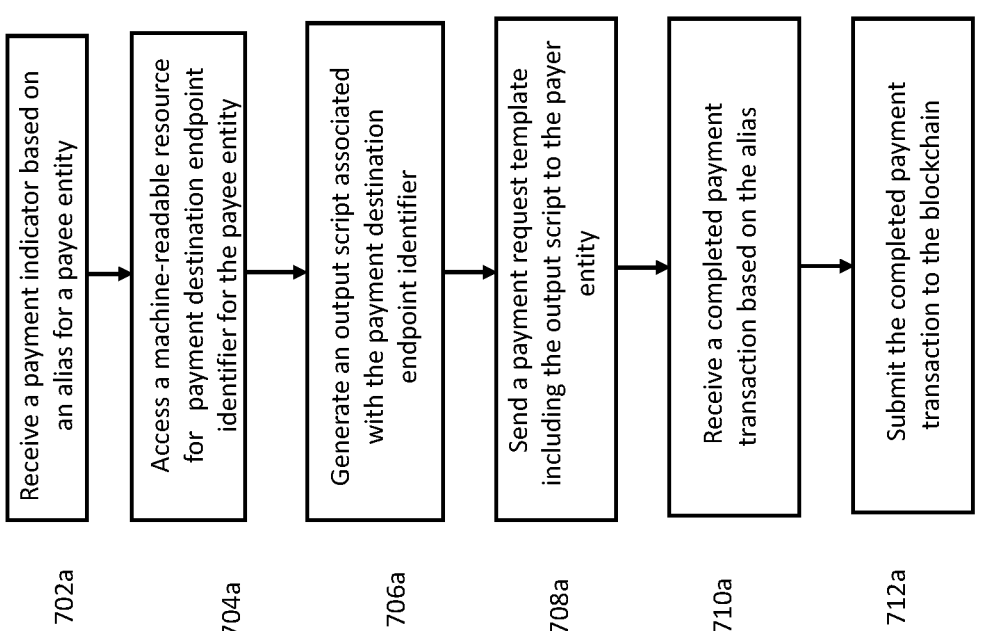

702a — Receive a payment indicator based on an alias for a payee entity

704a — Access a machine-readable resource for payment destination endpoint identifier for the payee entity 706a — Generate an output script associated with the payment destination endpoint identifier 708a — Send a payment request template including the output script to the payer entity 710a — Receive a completed payment transaction based on the alias 712a — Submit the completed payment transaction to the blockchain

Figure 7a

702b    Generate a payment indicator for an alias of a payee entity

704b    Obtain a payment request template with an output script for the payment to the alias 706b    Generate a completed payment transaction using the known alias 708b    Apply a digital signature to the completed payment transaction 710b    Send the completed payment transaction to the payee entity

COMPUTER-IMPLEMENTED SYSTEM AND METHOD FOR IMPLEMENTING ALIAS-BASED ADDRESSING FOR A DISTRIBUTED LEDGER

CROSS-REFERENCE TO RELATED APPLICATION

This application is a 371 National Stage Patent Application of International Patent Application No. PCT/IB2020/ 050686, filed on Jan. 29, 2020, which claims priority to U.S. patent application Ser. No. 16/384,696, filed Apr. 15, 2019, the disclosures of which are incorporated herein by reference in their entirety.

FIELD

This disclosure relates generally to methods and systems for facilitating transactions associated with a distributed ledger, and more particularly to methods for destination addressing for one or more of digital wallets. The disclosure is particularly suited, but not limited to providing methods for facilitating cryptocurrency payments from a payee to a payer.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is used herein to include any version or variation that derives from or is based on the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated cryptocurrency to another address associated with an input in another transaction. This is often done using a digital cryptocurrency wallet. This digital wallet may be a device, physical medium, program, application (app) on a mobile terminal, or a remotely hosted service associated with a domain on a network work, such as the Internet. The digital wallet stores public and private keys and can be used to track ownership of assets etc. associated with a user, receive or spend cryptocurrencies. The cryptocurrency itself is not in the digital wallet, In case of bitcoin and cryptocurrencies derived from it, the cryptocurrency is de-centrally stored and maintained in the publicly available ledger, i.e. the blockchain. There are various forms of known cryptocurrency wallets, and a network of such wallets is referred to as an ecosystem, such as the ecosystem of Bitcoin SV (BSV) wallets. The digital wallet may also be a Simplified Payment Verification(SPV) wallet.

Presently, in order to facilitate a BSV cryptocurrency payment between users, i.e. from Alice and Bob, Alice would need to have a digital wallet associated with her (private and public) cryptographic keys and would need to know Bob's public address for sending cryptocurrencies, i.e. Bob's digital wallet address. The public addresses associated with an entity, herein a digital wallet, as are usually automatically generated by an address generation program. These public addresses are a string of digits in a specific format that is recognised by the cryptocurrency network and is used for transactions. For instance, these may be the Bitcoin addresses for BSV based cryptocurrency networks. This can be referred to as the public key or hash of the public key of the asymmetric private/key pair associated with an entity. Public addresses can be shared publicly so that other users know where to send payments in cryptocurrency to. However, public addresses which are recognised and used by the BSV wallet ecosystem or other cryptocurrency wallets are in formats such as:

17Dx2iAnGWPJCdqVvRFr45vL9YvT86TDsn.

Accordingly, Alice would need to know or be provided with this type of an address to send cryptocurrency to Bob. Furthermore, more than one type of address may be used by the entity or wallet for different types of transactions, and these addresses may only be used once to facilitate one transaction written on the blockchain. It will be evident that these public addresses are not in a user-friendly or simple to use or memorise format. Thus, these public addresses or keys for transactions would need to be identified or obtained or derived for each transaction, and further may need to be stored/cached for certain periods by an entity wishing to make a cryptocurrency payment to another entity.

Thus, while it is desirable to use blockchain technologies for recording data and events, as the blockchain provides advantages such as a tamper-proof and permanent record, there is a difficulty in identifying or establishing a destination address for a cryptocurrency payment. This is because the operable format of these addresses recognised in a wallet ecosystem is not simple or user friendly. Once reason for this format could be the security aligned with it, along with specified naming protocols for public IP addresses applied across digital payment networks. Another reason is that the Bitcoin blockchain stores the data in transactions (Tx) which are built up into blocks. Identifying and then accessing the relevant data from the blockchain is based on the public address (linked to the private keys) of the entities involved in the transaction. The present disclosure addresses these technical concerns by providing aspects and embodiments for an improved destination identification and/or payment addressing for a cryptocurrency ecosystem.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which:

FIGS. 7a and 7b are flow diagrams depicting methods of implementing a simplified payment protocol or mechanism according to a fourth aspect, using the payment service of the second and/or the third aspects as implemented by a one or more processors of a payment service and a payment client entity, respectively.

DETAILED DESCRIPTION

Figure 1:
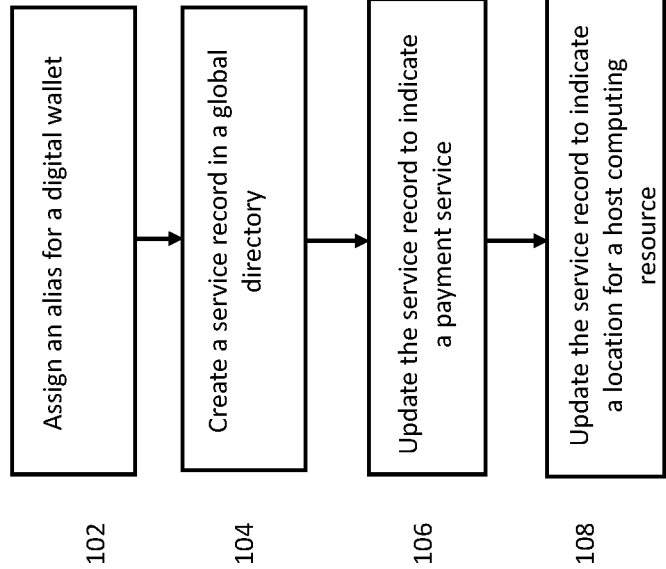
FIG. 1 is a flow diagram depicting a method of updating a directory to include a payment service according to a first aspect.

In accordance with a first aspect the present disclosure, a computer implemented method of implementing a payment service for one or more clients for transactions associated with a distributed ledger is provided. The method comprises providing an alias for a given client, the alias being specific to the given client, the alias including or related to a network identifier. The method then includes associating the alias with the network identifier in a directory. This association is achieved by the steps of creating a service record based on the network identifier in the directory. The service record is then updated to indicate that the payment service is provided by a network or a domain associated with the network identifier and a location for a host computing resource responsible for the payment service, wherein the host computing resource is configured to facilitate identification of the client associated with the alias, responsive to receipt of a request pertaining to a transaction related to the alias.

In some embodiments, the one or more clients referred to above relate to one or more entities such as computing resources, user terminals or applications associated with a computing resource. In some embodiments, each client may be a digital wallet or may be an entity that is associated with a digital wallet, such as a user terminal having a digital wallet or application for a digital wallet installed. Although the aspects and embodiments of the present disclosure relate to digital wallets, it is to be understood that client entities not having a digital wallet or a separate application for one, but which are configured to provide the functionality for operating as or with or similar to digital wallet are also within the scope of this disclosure. For ease of explanation alone, the following description relate to digital wallets (client entities associated with a digital wallet), but the disclosure is in no way limited to client entities with digital wallets alone.

The one or more digital wallets referred above in the first aspect is one of a plurality of digital wallets in a network, sometimes referred to an ecosystem of digital wallets, such as a wallet ecosystem of a plurality of Bitcoin BSV cryptocurrency wallets. In other embodiments, the wallet may not be part of a network of wallets and may simply be a separate, stand-alone entity that is associated with a domain. In both cases, the network identifier may be, or may include a domain name of a network, for example nchain.com. In some embodiments, the directory may be an open, i.e. accessible and/or a decentralised system such as the Domain naming system (DNS), and may be referred to as a global directory. The location of the host computing resource may be the location of a server that is responsible for the provision of the payment service for the network. For example this may be an endpoint universal resource identifier (URI) and may include the universal resource location (URL) of a web server, from where the payment service may be accessed by other entities. For example, the other entities may be digital wallets that may or may not be part of the network associated with the network identifier, one or more payment server or client entities, or a payment application.

Advantageously, the first aspect enables a domain owner of one or more digital wallets to make use of a payment service for managing one or more functions for facilitating transactions, such as payment transactions, from a requesting (payer) entity associated with a digital wallet to a destination (payee) entity as a one-time activity, i.e. by creation of a service record (an SRV record). Although service records in the DNS to identify an endpoint for a service are well known, such records have not been used or configured for enabling payment transactions associated with a blockchain.

Advantageously, the above aspect enables a request related to a payment transaction to be made using an alias to address the payee entity or digital wallet associated with the payee. Thus, there is no need for the requesting (payer entity) to know, obtain or save/cache complicated public addresses anymore, i.e. 17Dx2iAnGWPJCdqVvRFr45vL9YvT86TDsn, for a digital wallet in order to effect or construct a cryptocurrency transaction for the distributed ledger, so that a cryptocurrency payment can be made to this wallet. A memorable alias for or related to the network for the payee, for example one that may relate to an email address format of the payee (name@domain.com), would be all that is required to be known or sent by the requesting entity for requesting a payment transaction. Other formats that identify the entity may also be used as the alias. This type of alias addressing provides a much simpler and user friendly techniques for resolving an address for a payment destination. In some embodiments, even if the network identifier is not made explicit in the alias, as long as the alias can be associated with the network identifier, i.e. by a look up of a directory or database, this will suffice for identifying the payment service associated with the alias.

In some embodiments, the method includes performing a search of the directory based on the alias in response to a request from a requesting entity pertaining to a transaction associated with the alias. The request pertaining to a transaction refers to a request for information required to generate or construct transaction that is to be posted on the distributed ledger, i.e. the blockchain. Thus this request is not to generate the blockchain transaction itself, but simply a request for, or pertaining to, a future transaction, i.e. an off-block request for information for generating a transaction that is to be posted to the blockchain in the future. This is be understood to be a request for a future transaction for the blockchain. For ease of reference, the description henceforth discusses a request for a transaction to describe this step. It will be understood that this request pertains to a future transaction for the blockchain. The method includes identifying the service record for the payment service in the directory that relates to the network identifier and returning the location of the host computing resource for the payment service. Based on the returned location, a public address associated with the digital wallet associated with the alias can be determined. This will, in some embodiments, correspond to the public address that may be associated with a future transaction for a distributed ledger, i.e. the Bitcoin blockchain. In some embodiments the step of returning the location of the host computing resource includes returning a target and port pair, wherein the target includes an identifier of the host computing resource, and wherein the port includes an identifier for an Internet protocol communication port used by the payment service.

Advantageously, this enables discovery of a host responsible for providing a payment service to facilitate a payment transaction to a payee entity, based on just the alias of the payee entity, thereby significantly simplifying payment addressing for payment transactions for a digital ledger. Once the host has been located, a public address associated with the client or digital wallet of the payee entity can be determined since the digital wallet is associated with the network or network identifier, and thereby associated with the payment service. The term public address referred herein relates to an identity or address for a digital wallet or client, and in some embodiments, pertaining to one or more (future) transactions for the distributed ledger. In some embodiments, the public address may be the payment address or destination address for the client or digital wallet. In other embodiments, the public address may be used to derive the payment or destination address. This public address may be the same or may be different for each transaction that is associated with the digital wallet.

In some embodiments, the method according to the first aspect of the disclosure includes a method being implemented on a payment client entity. This may be a requesting entity that is associated with a digital wallet for cryptocurrency. In this case, the method implemented by the payment client entity comprises the steps of sending from a requesting entity a request for a transaction, the request associated with the alias. The method includes obtaining the location of host computing resource associated with the payment service, the location being based on a service record related to the network identifier that is identified in a search of a directory. The method then includes receiving a public address of the digital wallet associated with the alias, the public address for use in the requested transaction, henceforth.

In some embodiments, the host computing resource is associated with a payment network that is different to the network identifier associated with the one or more digital wallets, and wherein the payment service for a plurality of entities registered with a domain associated with the network identifier is delegated to a domain associated with the payment network.

Advantageously, this allows a network to delegate alias based payments to be managed and provided by a third party network associated with a completely different domain. In an alternative embodiment, the host computing resource is associated with the same domain as the domain as the network identifier. Alternatively, the domain owner may choose to implement the payment service within the network, in which case the endpoint identifier in the service record will be set or updated to refer to the same domain of the network (of digital wallets). Advantageously, the use of the service record to indicate the host or endpoint responsible for the alias based payment service makes it straightforward to add or modify a payment service provider for a digital wallet or a network of digital wallets. Once the service record has been updated, requests or look up searches can continue seamlessly once the new host location has been indicated in the service record.

In accordance with a second aspect, the disclosure relates to a computer implemented method of implementing a payment service for a one or more digital wallets for transactions using a distributed ledger, the method comprising creating a machine readable resource associated with the payment service, wherein the machine readable resource comprises an endpoint identifier for a host computing resource responsible for implementing the payment service for each digital wallet in the one or more digital wallets (or a network), where each digital wallet is associated with an alias. The machine readable resource further includes an entry associated with at least one capability among a plurality of capabilities supported by the payment service. The machine readable resource further includes instructions and/or a specification for accessing a public address or the location or one or more resources for facilitating transactions associated with the alias. The method further comprises providing the machine readable resource at a predictable or known location associated with the host computing resource for the payment service.

In some embodiments, each capability is specified in the machine readable resource as a name and value pair. In some embodiments, the capabilities include one or more of payee entity or payer entity validation for some or all transactions, functions for multiple digital signatures for transactions, payee entity or payment destination approval and/or email based payment transactions, so that a payment client may obtain transaction scripts via email etc.

Advantageously, the second aspect provides a means for discovering one or more capabilities or functions associated with a given payment service that is implemented for one or more digital wallets. Like the first aspect, all that is required by a requesting entity is an alias of the payer or destination entity, i.e. the alias associated with the payee's digital wallet, therefore providing a user friendly and simplified addressing mechanism. This advantage is ensured by the provision of a publicly accessible machine readable resource that specifies functions or capabilities offered by the payment service implemented for the digital wallets. This second aspect of capability discovery of a payment service based on a knowledge of only an alias for a payee entity is particularly useful when a payer entity associated with a digital wallet wishes to ensure that a capability or function for the transaction is supported for, when making payments to the alias, before a request to transfer is made. Certain functions may be considered key for facilitating a cryptocurrency payment transaction associated with a distributed ledger, such as locating at least one endpoint identifier associated with the payment service, or implementing a secure communication mechanism based on public key infrastructure (PKI) etc. These functions are in most cases specified separately to the capabilities entry in the machine readable resource. Advantageously the capabilities entry enables provision of a specification, i.e. a record, of all supporting functions that can be availed. For example, details for configuring specific types of validation, additional security for specified types of transactions or networks, levels of encryption, types of PKI architectures supported, levels of addressing etc. may be provided in the capabilities object. Accordingly, a requesting entity can discover and ensure that a required capability associated with the alias is firstly compatible with the requesting entity's resources, and secondly provided for any transactions with the alias by accessing the machine readable resource associated with the payment service of the alias.

In some embodiments, the method of the second aspect includes a step of determining a location for the host computing resource associated with the payment service according to the first aspect and the associated embodiments described above. Accordingly, the endpoint identifier in the machine readable resource is then obtained related to the determined host location.

Advantageously, this embodiment enables host discovery based on a look up of a directory, i.e. DNS for a service record first, followed by capability discovery of one or more functions supported by the payment service. Thus, upon receipt of request for a payment transaction associated with the alias, the service record matching the network identifier in the alias is identified, which is turn provides the location of the host, and in turn enables an endpoint identifier to be obtained. Capability discovery according to the second aspect is then performed based on the endpoint identifier in the machine readable resource.

It will be understood that the method according to the first aspect for host discovery is only one of many host discovery methods that may be performed, before capability discovery based on the machine readable resource is performed according to the second aspect. Thus the first aspect can be performed independently of the second aspect, and vice versa. Although a preferred implementation may include both, host and capability discovery as set out above, this combination is not essential for establishing the capabilities of the payment service associated with the alias. Other methods of host discovery, besides the use of the service record in the first aspect to identify a host location may, also be compatible with the second aspect. For instance, a text based record at a specified network path for the host location may be used, instead of the service record based implementation discussed in the first aspect. Furthermore, host discovery for resolving the endpoint identifier may in some embodiments be skipped altogether for the second aspect, if for example the location of the host is discoverable easily or has been made public or associated with the same domain as the one or more digital wallets.

Thus, the following embodiments set out are understood to be based on the second aspect alone or based on a combination of the above discussed first and second aspects.

In some embodiments, in response to receiving a request from a requesting entity for a transaction associated with an alias, the method further comprises steps of identifying the payment service associated with the alias based on the network identifier. Then, based on identifying the payment service, the method includes accessing the machine readable resource from the predictable or known network location. Upon determining if one or more capabilities required for the requested transaction are present in the machine readable resource, the method includes returning an endpoint identifier of the host computing resource for the payment service, and based on this, obtaining a public address associated with the alias in accordance with one or more of the instructions and/or specification in the machine readable resource.

Advantageously, the above embodiments enable obtaining a public address associated with the alias knowing only the alias and no further information to contact the payee entity. Further to determining that one or more capabilities in the machine readable resource conform to one or more requirements of the requesting entity or the transaction, the public address is obtained based on an endpoint identifier from the machine readable resource associated with the payment service. This thereby provides a seamless, simplified and user friendly technique to obtain a public address of an entity having just the alias to start with.

The above embodiment may also be implemented at a requesting client payment entity, i.e. the payer entity making the request for payment. In this case, the method includes sending from a requesting entity a request for a transaction, the request associated with the alias. The method includes accessing the machine readable resource from a location associated with the payment service, wherein the payment service being identified based on the network identifier in the alias, and wherein the machine readable resource is created as discussed above for the second aspect. Then, based on identifying if one or more capabilities required for the requested transaction are present in the machine readable resource, the requesting entity receives an endpoint identifier of the host computing resource for a payment service associated with the alias. The method includes obtaining a public address associated with the alias using one or more of the instructions and/or specification in the machine readable resource.

In some embodiments, each digital wallet is associated with a user or entity registered for the payment service in the network, wherein each digital wallet is a cryptocurrency wallet associated with a public key and a private key of an asymmetric cryptography key pair for transactions on the distributed ledger. In some embodiments, the step of obtaining the public address includes obtaining the public key of the digital wallet associated with the alias. In some embodiments, the public address associated with the alias is based on a cryptographic hash of the public key of the digital wallet associated with the alias. In related embodiments the public key of the digital wallet is an elliptic curve digital signature algorithm (ECDSA) public key, wherein the public key is not part of any transaction previously stored on or posted to the distributed ledger.

In some embodiments related relating to the second aspect of capability discovery, the instructions and/or specification in the machine readable resource comprise the following steps for obtaining a public key associated with the alias. These steps include obtaining a public key infrastructure (PKI) request template from the machine readable resource for a PKI endpoint identifier. Then the alias and the network identifier are to be included in the template in order to generate a complete PKI request, and then a HTTP GET request is sent based on the completed PKI request to obtain a public key associated the alias.

It is to be understood that although these instructions are present in the machine readable resource associated with the payment service, the instructions are intended to be performed by one or more computing resources or applications associated with a payment client entity. The one or more computing resources carrying out these instructions may be associated with a payment client application installed in or associated with a digital wallet of the payment client entity.

Advantageously, the provision of the machine readable document associated with the payment service enables making use of the known aliases to generate a suitable request in a specified format to the payment service to obtain a public key of the payee entity, the public key required for signing transaction for a distributed ledger.

In some embodiments, the known or predictable location of the machine readable resource is based on at least one of the endpoint identifier, an Internet protocol communication port used by the payment service and/or a configuration specification of the payment service included in a publicly accessible well-known domain repository. Advantageously, the above enables the machine readable resource to be easily located based on either a name of the payment service or the domain name associated with a network identifier.

In some embodiments, the machine readable resource is generated using a Java Script Object Notation (JSON) format. This is advantageous, as JSON is a lightweight data-interchange format which, although primarily being a machine readable language, is also easy for humans to read and write. It is easy for machines to parse and generate, thereby making it an ideal data-interchange language for generating the machine readable resource.

In a third aspect, the present disclosure provides a technique for payment destination addressing. This third aspect is related to the second aspect of capability discovery, as the machine readable resource is used for resolving addressing the payment destination, i.e. for sending payment. Optionally, the third aspect may include the first aspect of host discovery as well, although this is not essential as other means of host discovery may also be used in combination with the third aspect of the present disclosure.

The third aspect of the present disclosure provides a method where the step of obtaining the public address associated with the alias in the second aspect discussed above, further include the steps of obtaining a payment destination of a payee entity associated with an alias, the payment destination for use in constructing a transaction for making a cryptocurrency payment from a payer entity to the alias. The step of constructing the transaction according to the third aspect comprises, accessing the machine readable resource based on identifying the payment service. This is followed by returning a payment destination endpoint identifier based on the one or more instructions and/or specification in the machine readable document. Payment details for the transaction from the payer entity are then obtained, the payment details including at least an alias associated with the payee entity's digital wallet and an amount of cryptocurrency to be paid to the payee. A digital signature for associating the payment details with a cryptographic key for the payer entity is then obtained. An output script associated with the payment destination endpoint identifier associated with the alias is then generated for provision to the payer entity. The output script is provided for embedding in a payment transaction for the distributed ledger.

Advantageously, the third aspect enables receipt of an output script for the digital wallet associated with the alias to be obtained, thereby automatically enabling construction of a transaction that is in a suitable format for including on the digital ledger. This is based on knowledge of just the alias for the payee, and the remaining details are established from the machine readable resource associated with the host responsible for the payment service. Furthermore, enabling provision of an output script ready to be included in the transaction with knowledge of the alias alone provides an overall simplified, seamless, efficient, automatic, easy to implement and a user friendly alias based technique of payment addressing for digital wallets.

The method of the third aspect may also be implemented at or by a payment client entity, such as the digital wallet or an application or processor associated with the payment client entity that requests for the transaction. In this case, the method of constructing the transaction comprises sending from a payer entity a request for a transaction, the request associated with the alias. The method includes accessing the machine readable resource from a location associated with the payment service and receiving a payment destination endpoint identifier based on the one or more instructions and/or specification in the machine readable document. The payer entity then provides payment details for the transaction, the payment details including an alias associated with the payee entity's digital wallet and an amount of cryptocurrency to be paid to a payee entity. The method includes providing a digital signature for associating the payment details with a cryptographic key and receiving an output script associated with the payment destination endpoint identifier associated with the alias. The output script is then embedded in a payment transaction for the distributed ledger.

In some embodiments, the method of the third aspect includes obtaining a payment destination request template from the machine readable resource for a payment destination endpoint identifier. The alias and the network identifier are then to be included in the template to generate a complete payment destination request. A HTTP POST request is then generated based on the complete payment destination request to obtain the payment destination endpoint identifier associated with the alias.

It is to be understood that although these instructions are present in the machine readable resource associated with the payment service, the instructions are also intended to be performed by one or more computing resources or applications associated with a payment client entity. The one or more computing resources carrying out these instructions may be associated with a payment client application installed with or associated with a digital wallet associated with the payment client entity.

Advantageously, the provision of the machine readable document associated with the payment service enables making use of the known alias to generate a request in a specified format to the payment service to obtain a payment destination endpoint identifier or URI, so that this may be used in construction of a transaction for the distributed ledger.

In some embodiments, the public addresses of the alias and the payer entity each include a public key of a respective digital wallet associated with the payee entity and the payee entity, and wherein the digital signature is used for verifying the identity of the payer entity requesting the transaction. In some related embodiments, the digital signatures associated with both, the payer entity and the payer entity are required for verification of each respective entity, before the transaction is stored or posted on the distributed ledger.

In a fourth aspect, the present disclosure provides a process or protocol for when a payment client, i.e. the payer entity, wishes to make a cryptocurrency payment to another payment client, i.e. a payee entity. The protocol according to this aspect is referred to hereinafter as a simplified payment protocol. The fourth aspect is related to the second aspect of capability discovery, as the machine readable resource of the second aspect is used for implementing the simplified payment protocol . In some embodiments, the fourth aspect is related to the third aspect of payment destination addressing and provides improved techniques for implementing payment destination addressing, especially for simplifying the process for such addressing.

The fourth aspect relates to a computer implemented method of implementing a payment service for one or more clients for transactions associated with a distributed ledger, such as the Bitcoin blockchain. In a first implementation, the method is performed by one or more processors associated with a payment service. The method includes updating a machine readable resource associated with the payment service. This machine readable resource in some embodiments, is as discussed above in relation to the second aspect and is provided at or accessible from a predictable or well-known location associated with the payment service.

In the fourth aspect, the step of updating the machine readable resource comprises adding at least one further capability supported by the payment service, where the at least one further capability includes: implementing a simplified payment protocol for a given client among the one or more clients being associated with the alias.

The fourth aspect provides all the advantages associated with the second aspect discussed above for discovering one or more capabilities or functions associated with a given payment service that is implemented for one or more clients, where each may be associated with digital wallets in some embodiments . In some embodiments, the digital wallet associated with the payer client and/or the payee client is a simplified payment verification (SPV) wallet. Like the second aspect, all that is required by a requesting entity, i.e. a payer entity, is an alias associated with a payee's digital wallet, therefore providing a user friendly and simplified addressing mechanism, and providing a record of all supporting functions or capabilities that can be availed, or are supported by the clients associated with the payment entity in a manner which can be easily discovered by any entity that wishes to engage in a transaction with such clients.

A further advantage provided by the first implementation of the fourth aspect is the ease in providing or adding one or more new capabilities that are to be supported by the payment service. By updating the machine readable resource that is provided at the predictable or well-known publicly accessible location associated with the payment service, new capabilities that are added can be automatically rolled out or made applicable for all clients of the payment service, and a requesting entity will be able to establish that such new capability is now supported as and when the machine readable resources is accessed. Thus a new or updated capability can be straightaway discovered and applied for processing one or more requests that pertain to future transactions with one or more payment clients that are associated with the payment service.

In some embodiments, in addition to the added or further capabilities discussed above, there may be an indication to specify if the further capability or indeed even the originally created capabilities are true (on or 1) or false (off or 0). This toggle functionality is advantageous, as it enables a payment service to either enforce or not enforce one or more of the capabilities specified in the machine readable resource for certain types of transactions, or to set this enforcement value accordingly for certain durations. Thus, any payment entity, such as the payer entity will be able to check if a particular capability is actually enforced for the type of transaction that is pertaining to the request, or at the time that the request is being made. If, for instance, the requesting payment client, i.e. the payer entity in this case, is one that does not support or cannot respond to messages or instructions concerning such capability, the request may be withdrawn or simply not sent.

In the first implementation of the fourth aspect, at least one new capability that relates to implementing a simplified payment protocol is added for the payment service. In some embodiments, the instructions in the machine readable resource for the payment service is based on the provision of a payment transaction template from the payee entity associated with the payment service to a payer entity, where the template includes an output script. In some embodiments, the template may include the details of a required payment (the amount of bitcoin or digital asset needed), including a list of outputs (an endpoint URI for making the payment based on a template from the JSON document), expiration data, and other meta data needed to make the payment.

A second implementation of the fourth aspect is also performed by one or more processors associated with a payment service and is related to the implementation of the simplified payment protocol capability added in the first implementation. Here, a computer implemented method for implementing a payment service for transactions associated with a distributed ledger is provided. As with the previous aspects and embodiments, an alias is provided for a client among one or more clients associated with the payment service, the alias being specific to the client, each client being provided with a respective alias. The method comprises the steps of receiving from a payer entity a payment indicator for a cryptocurrency payment associated with an alias, the indicator pertaining to a payee client among the one or more clients associated with the payment service, the payee client being associated with the alias in the payment indicator. In some embodiments, the indicator or payment indicator being in the form or a request or notification that the payer entity wishes to make a digital asset payment to the payee entity. In some embodiments, this indicator may be automatically provided to the payee entity upon the payer entity requesting or obtaining one or more goods or services from the payee entity. The method includes the step of providing a payment request template based on a machine-readable resource associated with the payment service of the payee entity, the payment request template including an output script for the payee entity. In some embodiments, at least one capability supported by the payment service of the payee includes the simplified payment protocol as explained above. In some embodiments, the payment request template includes a payment destination endpoint, or URI, or public address for a digital wallet associated with the payee entity and/or other meta data for the payment. In some embodiment, the payee entity is associated with a digital wallet that is managed by the payment service. In some embodiments, the digital wallet is a lightweight or SPV wallet. The method includes receiving a completed payment transaction based on the payment template from the payer entity, the completed payment transaction associated with the alias and the network identifier. In some embodiments, the alias may include the network identifier, and is included in the template by one or more processors associated with a digital wallet of the payer entity, which may also be an SPV wallet. The method then includes providing the completed payment transaction to the distributed ledger, such as the blockchain. In some embodiments the completed payment transaction includes a digital signature as well as the digital asset or amount of cryptocurrency to be transferred. In some embodiments the method includes verification of the payer entity as explained in the above aspects of the second prior to submission to the blockchain, i.e. checking the public keys based on the PKI templates explained above, should the payer entity be associated with a payment service.

The method set out above is associated with the same advantages as explained above in relation to adding a new capability for the simplified payment protocol of the first implementation of the fourth aspect. In addition, advantageously, by the simplified payment protocol capability for the payment service, the processing of a digital asset payment, such as a crypto currency payment from a payer entity increases the security and reduces the amount of online interaction required with the payer entity making the payment.

Security is improved because the simplified payment protocol requires that all details, metadata and outputs for the payment is added to the payment template to be sent to the payer entity for completing , in order to process the cryptocurrency payment. This increases security for digital asset payments (as the payment is made based on the details sent from the bsvalias payment service). Thus, the present aspects prevent Man In The Middle (MITM) attacks given that the output scripts are encapsulated in the transaction template and sent to the payer entity directly by the payee entity. As discussed in relation to the second aspect, in some embodiments the payment service specifies instructions for obtaining the public address, which is subject to PKI templates for verification of the associated public keys as explained in relation to FIG. 4.

Advantageously, the simplified payment protocol capability according to the first implementation of the further aspect does not require the payer to be online, or in other words always connected to a communication network, to make a digital asset transaction to the payee. Since the output script is provided in the template, the payer client does not need to access the payment service of the payee client, i.e. the bsvalias payment service, to obtain the endpoints and metadata for a payment transaction for the distributed ledger. Thus, the fourth aspect allows an offline implementation, which is useful for payer clients , i.e. digital wallets associated with payer, that are not always connected to a communication network or which may be less computationally sophisticated, as there is no need for interaction with the payment service to obtain payment endpoints.

In addition, advantageously, the embodiments of the fourth aspect ensures ease of searching for and monitoring payments or transaction associated with a payee entity , as the payee entity is responsible for posting to the blockchain. Thus, there is no longer a need for a payee entity to monitor the blockchain for its transactions. The payer client will also be able to identify transactions for a given payee entity using the fourth aspect. Thus, the completed signed transaction is not posted by the payer entity but is instead provided to the payee entity by including the alias and network identifier in the payment request template provided in a JSON format from the machine readable resource of the payment service. Thus the simplified payment protocol is similar to the familiar invoice-based payment flow model, which makes it more adaptable and interoperable for businesses or organisations using traditional accounting systems that require purchase orders etc. for performing digital asset payments.

In some embodiments, the output script in the payment request template includes a payment destination, for use in constructing a transaction for a cryptocurrency payment from a payer entity to the alias, the output script provided by the payment service of the payee entity by the steps of accessing the machine-readable resource for the payment service, and obtaining a payment destination endpoint identifier based on the one or more instructions and/or specification in the machine-readable document. In some embodiment the payment destination is identified in a similar manner as explained in relation to the third aspect. The method then includes generating the output script associated with the payment destination endpoint identifier for the payee entity to which the alias pertains.

In some embodiments, the method of the fourth aspect includes receiving the completed payment transaction in the form of a HTTPS POST request from the payer entity, the completed payment transaction including the payment details for the payment transaction from the payer entity, the payment details including the alias associated with the payee entity client and an amount of cryptocurrency to be sent to the payee entity, and a digital signature for associating the payment details with a cryptographic key pertaining to the payer entity. In some embodiments, the HTTPS POST request of the fourth aspect is similar to the HTTPS POST request flow for the payment destination in in FIG. 6, but in this case the payer entity does not have to access the machine readable document as the output scripts are included in the payment request template from the payment service. In some embodiments the digital signature is verified based on the HTTPS GET request flow as seen in relation to FIG. 4 to resolve the public key of the payer entity, if the payer entity is associated with a payment service. The method then includes submitting the completed payment transaction to the distributed ledger.

In some embodiments the method of the fourth aspect includes the step of sending an acknowledgement to the payer entity response to receipt of the completed payment transaction. Thus, advantageously this enables the payer entity to keep track of the payment transactions that it sends to a payee entity associated with the payment service and can check the status of the transactions. The acknowledgement in some embodiments includes a transaction identifier (TxID) for each transaction.

For implementing the fourth aspect, the method carried out by a payer entity for a payment transaction to a payee entity includes the following steps, which are complementary to the above described methods of the fourth aspect implemented by the payment service for the payee client. The method herein includes generating a payment indicator for a cryptocurrency payment associated with an alias pertaining to a payee client and sending the payment indicator to the alias based on one or more instructions and/or specification in the machine-readable resource associated with the payment service for the alias. The method then includes obtaining a payment request template from the payment service pertaining to the alias, the payment request template including an output script for the payee entity. The method includes generating a completed payment transaction based on the obtained payment request template. This generation comprises the steps of including the alias and the network identifier in the template, applying a digital signature associated with a public key of a payer entity to sign the payment transaction; and providing payment including the amount of cryptocurrency to be paid to the alias. The completed payment transaction is then sent as a HTTP POST request to the payee entity associated with the alias.

The above method has the same advantages as those discussed above in relation to the method implemented by the payment service in accordance with the fourth aspect, except that it relates to the method taking place at the payer entity.

In some embodiments, the alias is referred to as a payment handle associated with a digital wallet in the network.

A further aspect of the present disclosure relates to a method for configuring a prefix for requesting a payment transaction from a requesting entity to an alias associated with a digital wallet in the network, such that responsive to receipt of a request from the requesting entity that includes the prefix and the alias, the first and/or second and/or third aspects of the disclosure may be automatically performed by the payment service based on the alias.

Advantageously, the fourth aspect enables automatically triggering the above described aspects and embodiments simply upon presentation of a prefix, such as "payto:" or "bsvto:" for example, followed by the alias of the payee entity that is known to the requesting entity. This prefix advantageously enables the request for a payment transaction to be generated and sent to the payment service based on one or more of the above discussed aspects and embodiments. All that the requesting entity need to do is add the known alias to the prefix.

The disclosure also provides a computing device, comprising: a processor; and memory including executable instructions that, as a result of execution by the processor, causes the computing device to perform any aspect or embodiment of the computer-implemented methods described herein.

The disclosure also provides a system includes a plurality of such computing devices that are operable together to implement any aspect or embodiment discussed above.

The disclosure also provides a non-transitory computer-readable storage medium having stored thereon executable instructions that, as a result of being executed by a processor of a computing device or system, cause the computing device or system to at least perform one aspect or embodiment of the computer-implemented methods described herein.

Some specific embodiments are now described by way of illustration with reference to the accompanying drawings, in which like reference numerals refer to like features.

FIG. 1 relates to the first aspect of the disclosure and depicts a method of implementing a payment service for one or more digital wallets that are associated with an alias. In FIG. 1, the method is understood to be implemented by one or more processors that are associated with the provision of a payment service. In this disclosure, the payment service may be one or more executable rules or protocols that perform the below described functions. The wallets may be in a network of digital wallets or may be individual stand-alone cryptocurrency wallets for transactions associated with a distributed ledger. For example, the method may be implemented in a network of Bitcoin wallets for BSV cryptocurrency. For simplicity of explanation and ease of understanding, an alias associated with a digital wallet in a network of digital wallets will be referred to henceforth in the description of the figures. However, as explained above the disclosure is not in many ways limited to the digital wallet being connected to other wallets in the network.

Step 102 relates to assigning or providing an alias for a given digital wallet in a network of digital wallets. This relates to providing a mapping or correlation of aliases with the respective public addresses associated with the digital wallets, so that the aliases can be used instead of the public addresses. Such assignment may be made when a particular payment client or entity signs up to the network, for example. At this point an "alias: public address" pair may be provided for each wallet. The alias is unique for a particular wallet and either includes a network identifier, such as the domain name of the network, or a name that identifies that network. For example, the alias may be in the well-known email format, such as clientname@domainname.com, where the clientname may simply be the name or an identifier of the individual or company that signs up for or registers with the network of digital wallets, like Alice or Bob. The domain name indicates an organisation or domain owner, for example "nChain". In this case, the alias for Alice would be alice@nchain.com. If Bob signs up to a different network of digital wallets that may have a domain name "notnchain", which also implements one or more aspects and/or embodiments of the disclosure, Bob's alias may be assigned as bob@notnchain.com. Other alias formats may also be used, such as AliceNC or BobBSV etc., as long as the alias is associated with a network identifier.

Step 104 relates to creating a service record for the payment service based on the network identifier in a directory. This step is needed for associating aliases with network identifiers that provide a payment service in the directory. The directory referred herein is usually a decentralised directory that is open, i.e. accessible publicly by all users. For example, a global directory such as the DNS can be used, which is decentralised and open such that it is accessible by any entity or users from anywhere over the Internet. While the open, accessible and decentralised directory is a preferred implementation, the present disclosure is not limited to this. In some embodiments, the directory referred may also be a centralised directory. In other embodiments the directory may be a closed directory, i.e. one that is accessible to users or entities registered with a network or service. Henceforth, a reference to a global directory such as the DNS will be in the description for ease of explanation. It will be understood by a skilled person that other types of directories are also within the scope of this disclosure.

For instance, when an alias is provided in an input or a request in the above discussed format, the directory such as the DNS is searched (c a DNS look up) to identify if payments can be made using the alias. If an alias associated with a network or domain that does not support an alias based payment service is input, this situation may be handled using one, or a combination, of the following implementations. In one implementation no result will be returned by the DNS indicating that payments using the alias cannot be made. If no service record exists, then the requesting entity will have to obtain the public address by other known techniques before any transaction associated with the distributed ledger can be made. In another implementation, for example when the service may be provided by the dame domain as the network identifier, the result returned may be a location of a host responsible for the network or domain associated with the alias. For instance, based on the example discussed above, if no service record for a payment service associated with the network identifier in the alias exists in the directory, then a location or URI for a host responsible for the domain "nchain" may be provided, or the requesting entity may be directed to the host for the domain "nchain". Thus, the host responsible with the domain indicated in the alias may deal with the request further.

Step 106 relates to updating or including in the service record created in step 104, an entry or field to indicate the payment service that is provided by the network or domain associated by the network identifier. Updating the service record in the DNS indicates that a particular network identifier, such as nchain.com provides or uses a certain payment service, for example one that is identified as "bsvpay" or "bsvalias", for instance. This step of updating indicates to the entity performing the DNS lookup that the identified payment service, i.e. considering "bsvalias", enables payment transactions to be made for an alias associated with the nChain domain.

Step 108 relates to updating the service record to indicate a location for a host computing resource responsible for the payment service indicated in step 106. Therefore, if the payment service was associated with a different network or domain to the digital wallet's network, then this entry in the service record would point to the web server location or IP address of the host computer or server responsible for the service. Following on from the above example, if the bsvalias payment service was associated with a separate network or separate domain (bsvalias.com), then the location or instructions for locating the host server for bsvalias.com is indicated in the service record. This is to identify where the host computing resource that is configured to facilitate identification of the digital wallet associated with the alias can be found.

An example of a service record (sry record) in the DNS defining the location of servers for specified services is seen below:

A service record for the domain name (nchain) relating to the payment service (bsvalias) may be in the below form, with fields or entries such as:

service: the symbolic name of the desired service.

proto: the transport protocol of the desired service; this is usually either transmission control protocol TCP or User datagram protocol UDP name: the domain name for which this record is valid, ending in a dot.

TTL: standard DNS time to live field, which sets an expiration period or limitation relating to the record.

class: standard DNS class field.

priority: the priority of a target host.

weight: A relative weight for records with the same priority.

port: the TCP or UDP port on which the service is to be found.

target: the canonical hostname of the machine providing the service.

For example, a domain owner of nchain may create an SRV (service) record with the following parameters:

| Parameter | Value |
|-----------|-------|
| Service | _bsvalias |
| Proto | _tcp |
| Name | nchain |
| TTL | 3600 (for example) |
| Class | IN |
| Priority | 10 |
| Weight | 10 |
| Port | 443 |
| Target | payment-services.nchain.com |

Figure 2A:
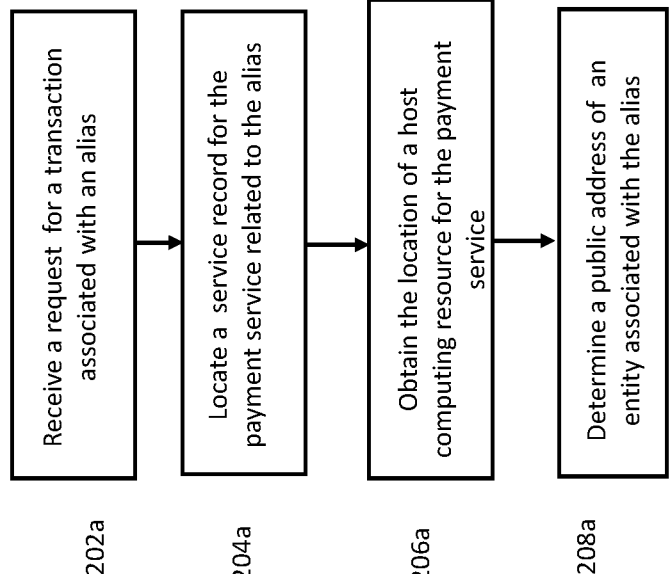
FIGS. 2a and 2b are flow diagrams depicting methods of identifying a host responsible for a payment service according to a second aspect , implemented by a one or more processors of a payment service and a payment client entity, respectively.
Figure 2B:
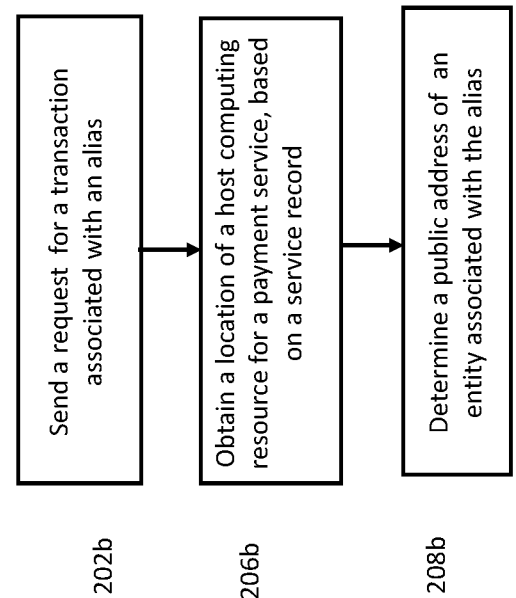

FIGS. 2*a* and 2*b* are flow diagrams depicting a method of identifying a host responsible for a payment service. FIG. 2*a* shows the method implemented by a one or more processors associated with the payment service, while FIG. 2*b* shows the method implemented by a one or more processors associated with the payment client entity.

In step 202*a* of FIG. 2*a*, the payment service receives a request from a requesting entity for a transaction associated with the alias. This request may be in the form of an input from an interface of a computing device of the requesting entity, i.e. the digital wallet that may be installed. For example, the request may include a request that indicates, payto alice@nchain.com from a payer entity.

In step 204*a*, responsive to the request or input in step 202 a search or lookup of the global directory, for example a DNS lookup is performed based on the alias input. This is to locate the service record for the payment service in the global directory that relates to the network identifier in the alias. Thus, using the same example as discussed above for FIG. 1, this step will identify the service record for the domain nchain as shown above, since nchain in the network identifier in the alias received. This service record for nchain will then identify that bsvalias is the payment service used for nchain.

In step 206*a*, once the service record, and hence the payment service, i.e. bsvalias has been identified, the location of the host computing resource for the payment service is obtained. In some embodiments this is returned to the requesting entity. In the example above, this location for the host corresponds to the target: port pair in the sry record for nchain. The target: port pair provides the location that a responsible host for the service bsvalias uses or operates from.

In step 208*a*, based on the location, i.e. target: port pair, of the host obtained in step 206*a*, a public address of the digital wallet associated with the alias may then be determined. In some embodiments, this may be based on a mapping upon signing up for the payment service or network, as for instance discussed in relation to FIG. 1. Once a public address is obtained, this can be used for bitcoin blockchain transactions between digital wallets.

FIG. 2*b*, as mentioned above relates to steps corresponding to FIG. 2*a* but implemented on the payer or requesting entity's computing device or digital wallet.

Thus, step 202*b* relates to sending a request for a transaction from a requesting entity, the request associated with the alias.

Step 206*b* relates to obtaining the location of the host computing resource associated with the payment service, the location being based on a service record related to the network identifier. This for example is carried out in steps 204*a* and 206*a* of FIG. 2*a*. Thus, the location obtained here will be the target: port pair for the host for "bsvalias" payment service.

In step 208*b*, the public address of the digital wallet associated with the alias is then obtained, so that this may be used for the transaction associated with the digital ledger.

Figure 3A:
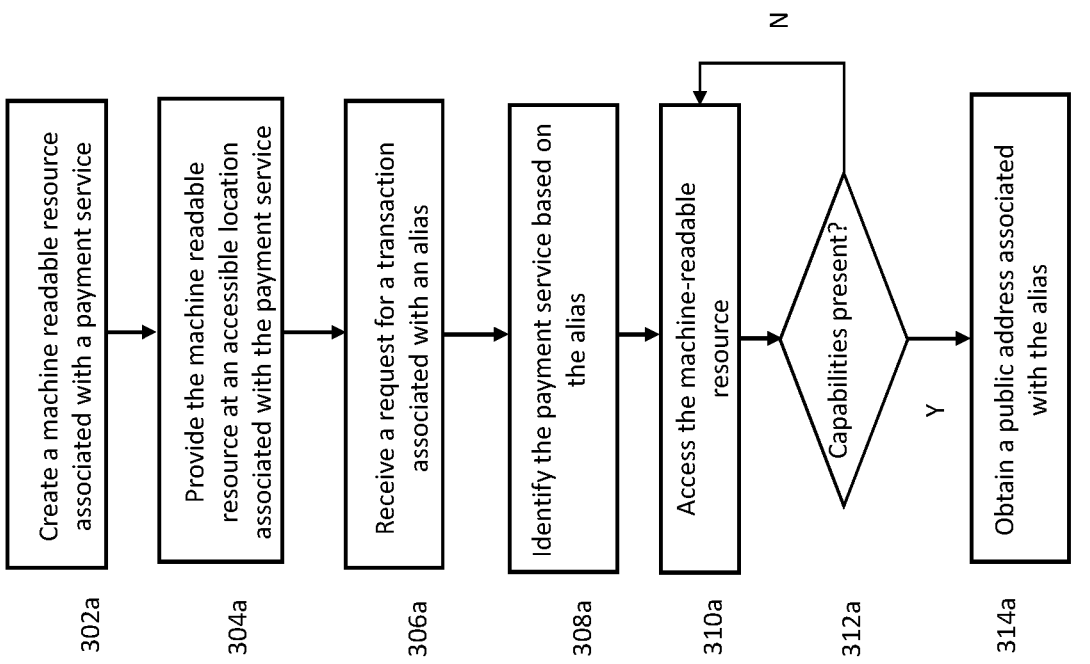
FIGS. 3a and 3b are flow diagrams depicting methods of identifying a public address associated with an alias according to a second aspect, implemented by a one or more processors of a payment service and a payment client entity, respectively.
Figure 3B:
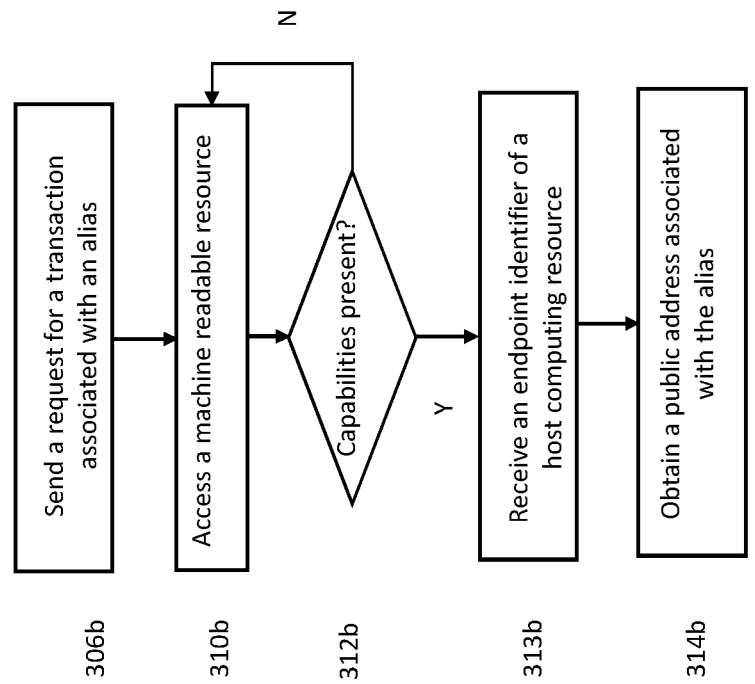

FIGS. 3*a* and 3*b* are flow diagrams depicting methods according to the second aspect of the disclosure, for identifying a public address associated with an alias in a request for a transaction. FIG. 3*a* shows the method implemented by a one or more processors associated with the payment service, while FIG. 3*b* shows the method implemented by a one or more processors associated with the payment client entity.

In step 302*a* of FIG. 3*a*, a machine readable resource is created for the payment service. The machine readable resource is provided for ensuring that functions or capabilities offered or supported by the payment service and/or any instructions to make use of these capabilities can be identified. Henceforth, this process is referred to as capability discovery relating to the payment service. Thus, the machine readable document is created for a capability discovery process by which a payment client entity or a digital wallet or application that may wish to use or request a service can learn or discover the supported features of the payment service, and any respective endpoints and configurations associated with using the payment service. In some embodiments, the machine readable resource is a file or a document that is previously generated and saved in associated with the payment service, i.e. is a static document. In some embodiments, for instance in an enterprise-grade service implementation, the machine readable resource may be dynamic and can generated this on demand rather the as a static file that is saved onto a web server, for instance. Advantageously, such dynamically generated resources provide a simplification in service deployment, migration, maintenance and any upgrade that may be required to be carried out.

In some embodiments, JSON (JavaScript Object Notation) which is a lightweight data-interchange format, is used to generate the machine readable resource. JSON is a text format that is completely language independent but uses conventions that are familiar to programmers of the C-family of languages, including C, C++, C#, Java, JavaScript, Perl, Python, and many others. These properties make JSON an ideal data-interchange language. Further JSON is built on two structures, a collection of name/value pairs and an ordered list of values. In most languages, this is realised as an array, vector, list, or sequence. As these are universal data structures, virtually all modern programming languages support them in one form or another. Thus, using JSON for the machine readable resource is preferable, as it provides a data format that is interchangeable with other programming languages that may also be based on these same structures.

The machine readable resource may include the following information relating to the payment service. at least one an endpoint identifier associated with a host computing resource responsible for implementing the payment service. This may be the location, i.e. a target: port pair, for a server or computing resource responsible for one or more functions of the payment service. an entry associated with at least one capability among a plurality of capabilities supported by the payment service. This may be one or more functions, such requesting entity or payer entity validation, multiple digital signatures for transactions, payee entity or payment destination approval for transactions, and/or email based payment transactions so that transactions are sent to an email address associated with an alias before posting to a distributed ledger, payer and/or payee call-back function relating to requests or responses etc. that may be supported by the payment service.

instructions and/or a specification for accessing a public address (of an entity or digital wallet), that may be used for facilitating transactions with the entity or digital wallet associated with the alias. In some embodiments, accessing the public address includes accessing one or more resources or URI's associated with the payment service, based on the alias. In some embodiments, once obtained, the public addresses address may be used in an output script that is used in construction of a transaction for the distributed ledger. In some embodiments, accessing the public addresses may include resolving the public keys for the entities based on PKI procedures and/or resolving the payment destination, i.e. the payee digital wallet.

For instance, the machine readable resource may indicate the following file or entry for the payment service "bsvalias"

```
{
  "bsvalias": "version ..."
  "capabilities": {...
    "pki": "https://bsvalias.example.org/ {name} @ {domain.tld}/id",
    "paymentDestination": https://bsvalias.example.org/ {name} @ {domain.tld}/payment-destination"
  }
}
```

The template values {name} and {domain.tld} refer to the components of the alias format <name>@<domain>.<tld>, where tld is a top level domain such as .com or .org or .co.uk etc. Requesting entities or payment clients may replace the templates with the alias. Thus, in the above example, this will be alice@nchain.com.

Step 304a relates to storing the machine readable resource at a predictable or known location associated with the payment service. For example, a payment service operator or processor for the payment service "bsvalias", following creation of a JSON formatted text document as described above in step 302a may provide the document at the following location:

http://<host-discovery-target>:<host-discovery-
    port>/.well-known/bsvalias.

Providing the JSON formatted document at a well-known predictable location is useful so that it is publicly accessible to all entities who are aware of the payment service (based on network identifier, for example). The above example location is based on the Internet Assigned Numbers Authority's (IANA's) Well-Known URIs resource. Thus, the machine-readable resource is placed in a predictable location on a web server for capability discovery relating to the payment service bsvalias.

In step 306a, a request for a transaction from a payment client entity is received, the request including an alias to which the payment is to be directed. Following on from the above discussed example, this includes a request such as payto:alice@nchain.com In step 308a, the payment service associated with the alias is identified. This is based on the network identifier, i.e. nchain, in the alias. The payment service associated with this identifier, i.e. bsvalias, is identified in this step. Host discovery according to the first aspect to identify a service record may also be performed prior to this, although this is not essential for the embodiment shown in FIG. 3. For example, a mapping stored in a database or a text document based service discovery process may also be used to identify the host for bsvalias instead of the service record in the first aspect.

In step 310a, based on the identified payment service, the machine readable resource for the payment service is accessed from the predictable or known network location. For example, the JSON document for the service bsvalias is obtained from the well-known location as specified in step 304a.

Step 312a determines if one or more capabilities for the requested transaction are present in the machine readable resource. This step involves identifying if one or more entries relating to supported capabilities are suitable for the request. For example, this may include checking that a common capability is supported by the requesting client entity's payment service and the capabilities in the JSON document for bsvalias, i.e. the payment service for the payee alce@nchain.com. In some cases, no additional capabilities may be specified or required by the requesting entity, in which case the payment transaction can proceed whether there are common capabilities or not.

In step 314*a*, assuming that the machine readable resource has at least one supported capability for the transaction (if this is specified by the requesting entity), once this has been identified, an endpoint identifier associated with the host computing resource for the payment service is returned from the machine readable resource. In the above example, this may be a location for a responsible host for bsvalias. A public address can then be obtained for the digital wallet associated with the alias using one or more of the instructions and/or specification in the machine readable resource for the payment service "bsvalias".

FIG. 3*b*, as mentioned above relates to steps corresponding to FIG. 3*a* but implemented on the payer or requesting entity's computing device or digital wallet.

Thus, step 306*b* relates to sending a request for a transaction from a requesting entity, the request associated with the alias, i.e. sending a payto:alice@nchain.com, following the above discussed example.

In step 310*b*, following identification of the payment service based on the network identifier in the alias, for example as set out in step 308*a* of FIG. 3*a*, this step includes accessing the machine readable resource by the requesting client from the well-known location associated with the identified payment service, for example as set out in step 304*a* of FIG. 3*a*.

Step 312*b* relates to the requesting entity determining if one or more capabilities for the requested transaction are present in the machine readable resource. This step involves checking the JSON document to identify if one or more entries relating to a common or specified supported capability will be suitable or needed for the requested transaction, similar to step 312*a* of FIG. 3*a*.

In step 313*b*, based on identifying if one or more capabilities are present in the machine readable resource, the requesting client receives an endpoint identifier associated with the host computing resource for the payment service, i.e. the host location for the service bsvalias.

In step 314*b*, the requesting client then obtains a public address associated with the alias. This can be obtained by the requesting client performing functions in accordance with one or more of the instructions and/or specification in the machine readable resource.

Figure 4:
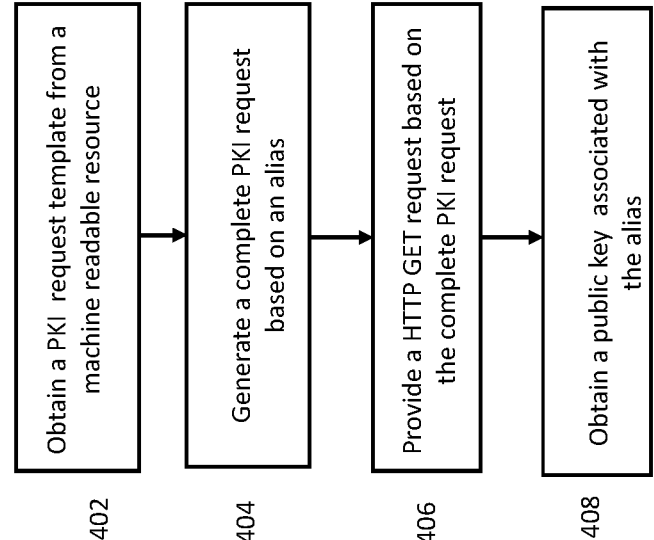
FIG. 4 is a flow diagram depicting a public key infrastructure sequence.

FIG. 4 depicts an example sequence of instructions specified in the machine readable resource of the second aspect for implementing a public key infrastructure (PKI) technique for obtaining cryptographic keys associated with the alias.

In step 402, a PKI request template from the machine readable resource must be obtained from the machine readable resource associated with the payment service. This template is in some embodiments a temple to request a PKI endpoint identifier, which is a URI for a computing resource for the payment service that is configured for identifying and/or validating public keys of payment client entities. For instance, following on from the example above, the template may be:

"pki": "https://bsvalias.example.org/{name}@{domain.tld}/id

In step 404, once the template has been received, the alias and the associated network identifier is included or substituted in the appropriate fields of the template, to generate a completed PKI request. For example, the template values {name} and {domain.tld} refer to the components of alias, i.e. <name>@<domain>.<tld> and must be substituted before issuing a complete request based on the machine readable resource. The result of this step is the provision of a PKI endpoint identifier for "bsvalias".

In step 406, a HTTP GET request is made based on the PKI endpoint identifier obtained in step 404.

In step 408, a public key associated with the alias can then be obtained in response to the request made in step 406. In most cases, the public key is a stable elliptic curve digital signature algorithm (ECDSA) public key that has not been used as part of any on-chain transaction. If a request for a valid alias, i.e. one that is associated with a payment service and has been assigned a public key, has been received, then a return message from a host responsible for the payment service's PKI may be in the following format to return the public key.

```
{
    "bsvalias": "1.0",
    "alias": "<name>@<domain>.<tld>",
    "pubkey": "..."
}
```

The ECDSA public key will be a valid point on the secp256k1 curve, compressed, and hex-encoded. This means that the "pubkey" string length is 66 bytes long (33 bytes binary, each byte encoded as two hex characters):

| Start | Length | Value |
|---|---|---|
| 00 | 02 | "Odd/even" indicator, either "02" or "03" |
| 02 | 64 | Elliptic curve point x-coordinate |

If the request is based on an alias that is not valid, i.e. one that is not associated with the payment service and/or a public key, then the return message will indicate that an error has occur or that the requested resource is not found or is unavailable or unauthorised.

Figure 5A:
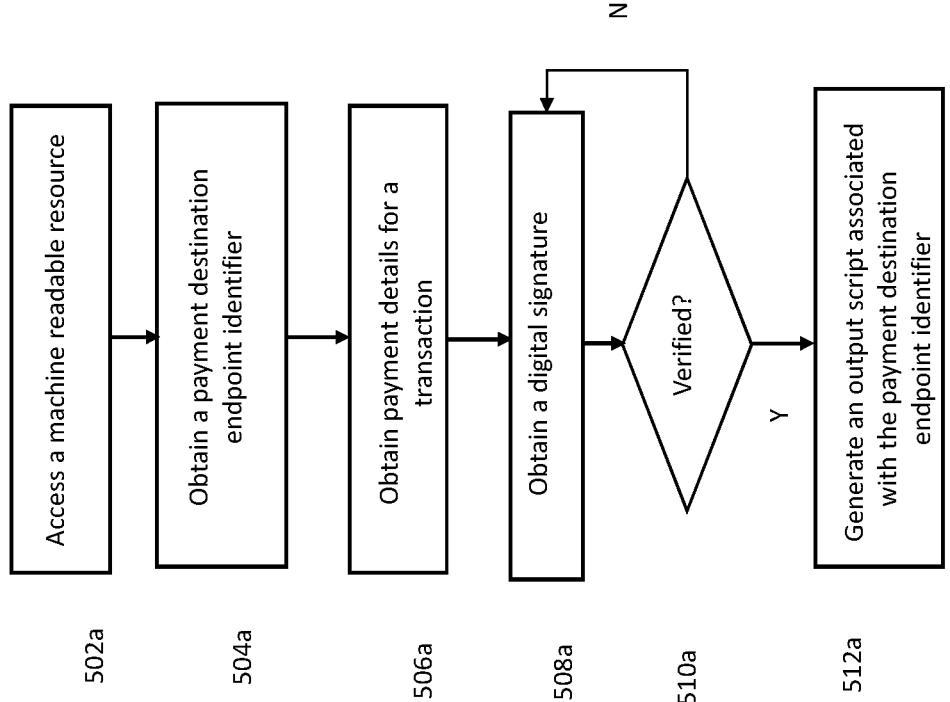
FIGS. 5a and 5b are flow diagrams depicting methods for destination addressing according to a third aspect, implemented by a one or more processors of payment service and a payment client entity, respectively.
Figure 5B:
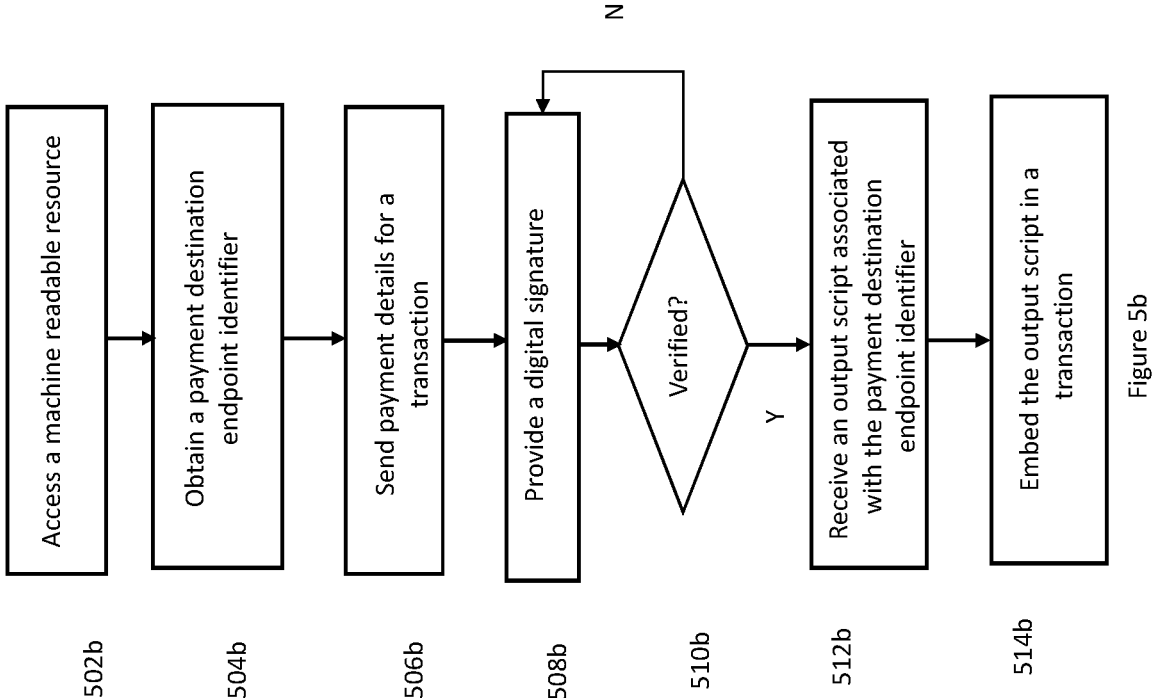

FIGS. 5*a* and 5*b* are flow diagrams depicting methods according to the third aspect of the disclosure, for identifying a payment destination associated with an alias in a request for a transaction. The payment destination is used in constructing a transaction for a distributed ledger. FIG. 5*a* shows the method implemented by a one or more processors associated with the payment service, while FIG. 5*b* shows the method implemented by a one or more processors associated with the payment client entity. In some embodiments, obtaining the payment destination is based on, or is part of obtaining the public address associated with the alias in FIGS. 3*a* and 3*b*. In some embodiments, the payment destination endpoint identifier relates to an address that is to be encoded or included in an output script, so that a transaction may be constructed for the blockchain based on this address. In some embodiments, the payment destination endpoint identifier is the same as the public address referred above. In other embodiments, the payment destination endpoint identifier may be different to the public address associated with the alias or may be part of or associated with the public address for the digital wallet. In some embodiments, the public address and/or the payment destination endpoint identifier associated with the alias may static or dynamically assigned.

Step 502*a* of FIG. 5*a* relates to accessing the machine readable resource for the payment service, following identifying the payment service in the alias. The identity of the payment service as well as the location of the machine readable resource can be obtained as described above in relation to FIGS. 1, 3*a* and/or 3*b*.

In step 504*a*, a payment destination endpoint identifier is obtained from the machine readable resource, using the one or more instructions and/or specification in the machine readable document. This endpoint may be a URI for a computing resource or server for the payment service that is configured for resolving the payment destination endpoint for the digital wallet associated with the alias.

In step 506a, payment details for a payment transaction is obtained from a payer entity. For example this may include at least the alias associated with the payee entity's digital wallet, and an amount of cryptocurrency to be paid to the payee. This may be provided using an interface associated with the payer entity's computing resource or application.

In step 508a a digital signature for the request with the payment details in step 506a and a cryptographic key associated with the payer entity is obtained. This signature related to the request pertaining to a transaction is in most cases applied using the private key of the requesting, i.e. payer entity.

In step 510a the digital signature may be verified, so that the identity of the payer entity can be authenticated. This may be performed using one or more known techniques. In some embodiments, assuming that ECDSA keys are used, the public key of the payer entity, for instance obtained using the PKI sequence in FIG. 4, can be used to verify the identity of the signing entity (the payer entity). If verification fails, a digital signature may need to be provided once again, or one or more error messages could be generated.

In step 512a, following a successful verification outcome in step 510a, an output script based on the payment destination endpoint identifier associated with the alias is generated. This output script is provided for embedding in a payment transaction for the distributed ledger, in order to automatically resolve the payment destination in a transaction for the distributed ledger.

For example, the output script returned for construction of transactions for the distributed ledger, i.e. a Bitcoin blockchain, may conform to the following schema:

```
{
    "output": "..."
}
```

The value of the output field may be a hex-encoded Bitcoin script, which the payer entity will use during the construction of a payment transaction.

Various possible types of output script may be generated, but for ease of explanation, a Pay to Public Key Hash (P2PKH) output script generation is discussed in the following example.

Given a key pair with the public key of
027c1404c3ecb034053e6dd90bc68f793328455
   9c7d0763367584195a8796d9b0e, a P2PKH output
   script for the same may be hex-encoded as:
76a9140806efc8bedc8afb37bf484f352e6f79bff1458c88ac
This can be broken down as follows:
76; OP_DUP
a9; OP_HASH160
14; Push the next 20 bytes on to the stack
08 06 of c8; ripemd160 (sha256 (compressed_pub-
   lic_key))
be dc 8a fb
37 bf 48 4f
35 2e 6f 79
bf f1 45 8c
88; OP_EQUALVERIFY
ac; OP_CHECKSIG The service response body, i.e. the script for embedding in the transaction in step 512a would then be:

```
{
    "output": "76a9140806efc8bedc8afb37bf484f352e6f79bff1458c88ac"
}
```

FIG. 5b, as mentioned above relates to steps corresponding to FIG. 5a but implemented on the payer or requesting entity's computing device or digital wallet.

In step 502b, based on a request for a transaction from a payer entity where the request associated with the alias, the machine readable resource is accessed by the payer entity from a location associated with the payment service.

In step 504b, a payment destination endpoint identifier based on the one or more instructions and/or specification in the machine readable document is obtained by the payee entity.

Step 506b relates to sending or providing payment details for the transaction, the payment details including an alias associated with a payee entity's digital wallet and an amount of cryptocurrency to be paid to the payee.

Steps 508b and 510b relate to the payer entity providing a digital signature for associating the payment details with a cryptographic key, followed by verification as discussed in the corresponding steps in FIG. 5a.

Step 512b relates to receiving an output script by the payer entity based on the payment destination endpoint identifier associated with the alias. This is explained in related to FIG. 5a above.

Step 514b relates to constructing a payment transaction for the distributed ledger by the payer entity, by embedding the received output script in the transaction.

Figure 6:
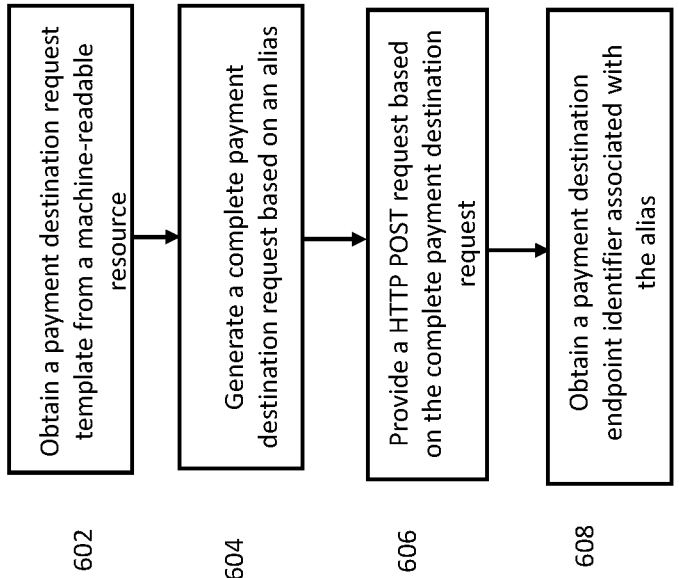
FIG. 6 is a flow diagram depicting a payment destination endpoint resolution sequence.

FIG. 6 depicts an example sequence of instructions specified in the machine readable resource for implementing a payment destination endpoint resolution sequence associated with the alias for the digital wallet.

In step 602, a payment destination request template from the machine readable resource is obtained from the machine readable resource associated with the payment service. In some embodiments, this is a temple to request the payment destination endpoint identifier discussed in FIGS. 5a and 5b. For instance, following on from the examples discussed above for the payment service bsvalias, the template may be:
   "paymentDestination":     http://bsvalias.example.org//
      {name}@{domain.tld}/payment-destination In step 604, once the template in step 602 has been received, the alias and the associated network identifier is included or substituted in the appropriate fields of the template, to generate a complete payment destination request. For example, the template values {name} and {domain.tld} refer to the components of target alias, i.e. <name>@<domain>.<tld>and must be substituted before issuing a complete request based on the machine readable resource. The result of this step is the provision of a payment destination endpoint identifier, which in some embodiments may be a URI for a computing resource that is responsible for identifying the payment address that is to be used for generation of an output transaction script associated with the alias.

In step 606, a HTTP POST request is made based on the payment destination endpoint identifier obtained in step 604.

In step 608, an output script related to the alias and based on the payment destination endpoint identifier is returned, which is in turn used in the construction of a payment transaction for the distributed ledger, as discussed in FIGS. 5*a* and 5*b*.

In some embodiments that are related to the above discussed third aspect, the body of a request for a payment destination according to the third aspect (such as the request associated with steps 502*a,* 502*b* or the POST request in FIG. 6 discussed above), may indicate a content type of application/json. This is because templates for making or completing the request is based on the machine-readable resource for the payment service, i.e. bsvalias. In some embodiments, the request from a payer entity may conform to the following schema, in addition to identifying the alias of a payee entity in the request, as indicate above (see FIG. 6 for instance):

```
{
    "payerName": "FirstName LastName",
    "payerHandle ": "<alias>@<domain.tld>",
    "dt": "<ISO-8601 timestamp>",
    "amount of cryptocurrency": 550,
    "purpose": "message to payee",
    "signature": "<compact Bitcoin message signature>"
}
```

The fields of the above schema are briefly explained in the below table, with further explanation of some of the fields given below.

| Field | Description |
| --- | --- |
| payerName | Human-readable payer display name |
| payerHandle | Alias associated with the payer entity or payer's digital wallet |
| dt | A timestamp, which may be in a preferred or accepted format, such as an ISO-8601 formatted timestamp (see below) |
| amount | The amount of cryptocurrency, such as BSV (Satoshis) or Ethereum or other Bitcoin or IBM chains, etc. that the payer intends to transfer to the payee client entity |
| purpose | Human-readable description of the purpose of the payment, i.e. for subscription payment, to clear an outstanding balance, etc. |
| signature | This may be a compact Bitcoin message signature (see below) |

In some embodiments, in addition to including the alias of a payee entity, it may be enough if the field identified as payerHandle in the above schema is present, or associated with the request. In some embodiments, if the payer entity or digital wallet associated with the payer client does not have an alias for payment transactions, then this payerHandle may simply be associated with a public identifier or IP or Bitcoin address for the payer. Hereinafter, the payerHandle in this disclosure is described as being an alias associated with the payer client entity. Thus, in such embodiments, the payer entity has an alias, and is associated with a payment service for facilitating payment transactions based on the alias. The payer's payment service that may be the same as or different to the payment service of the payee.

In some embodiments, the timestamp field as noted by "dt" in the above table, as well as the payerHandle may be required in the schema for the request. In other embodiments, the timestamp, payerHandle as well as the signature filed may be requested for certain requests or in order to operate in accordance with one or more capabilities that may be present in the machine-readable resource associated with the payee client.

The remaining fields may be optional as far as functioning or operation of the request is concerned. However, in many situations the amount is usually indicated (even if this is 0). The optional fields or non-zero values for the optional fields but may be present in the request if it is known or if the information is available to the payment entity, i.e. the payer entity in this case. The timestamp and signature fields, which may be considered mandatory for certain payment service capabilities that are specified in the machine-readable resource, are explained below.

The timestamp field "dt" may contain an accepted standard ISO-8601 formatted current time at the point when the payer initiates a payment destination request. From JavaScript, this can be constructed using the command or instruction relating to the machine-readable resource, such as JSON.stringify ( ). For instance, this may return the following:

let now=JSON.stringify ({'now': new Date ( )});
Which may yield for example:

```
{
    "now": "2013-10-21T13:28:06.419Z"
}
```

In some embodiments, the signature field may be based on a payment entity or client's ability to sign messages and verify message signatures. This functionality is, in most cases, essentially an implementation of standard ECDSA, however with an (r, s) signature pair for integers r and s, there is additional information provided to allow a client to verify a message signature against a P2PKH address (a hash of a public key) rather than directly against a public key.

In some embodiments, the signature may be the raw (r, s) fields, computed over a double-SHA256 hash of the message, which in this case is the request discussed above. In order to leverage existing Bitcoin client libraries, such as MoneyButton's BSV library for example, or other similar cryptocurrency libraries, existing signing and verification protocols may be suitable for some embodiments.

In some embodiments, the MoneyButton BSV library's implementation is nominated as the standard message digest construction and signature encoding method for signatures included in payment destination requests. The message or request to be signed may begin with Bitcoin signature scheme's traditional or known preamble (as may be documented within a BSV library's source code), and is followed by the Unicode Transformation Format-8-bit (UTF8) string concatenation of the fields payerHandle and dt, and optionally the amount and purpose fields that are discussed in the above example schema.

Regarding the specification of the amount in the request, based on the above discussed schema, the following rules may apply for some embodiments:

If amount is present, it is converted to a string (with no leading zeros)
If amount is not present, the string "0" is used
If purpose is not present, an empty string " " is used (effectively purpose is not included in the message)

Figure 7B:
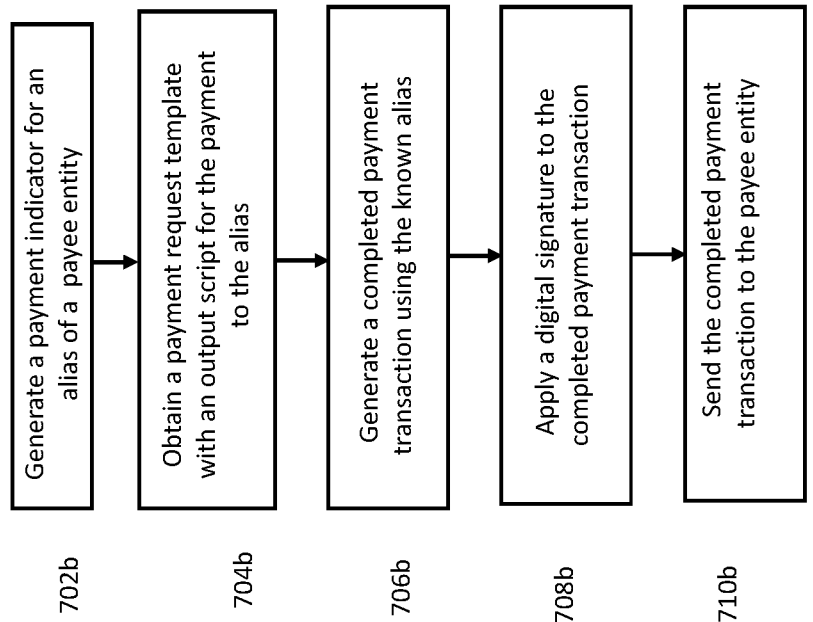

FIGS. 7*a* and 7*b* are flow diagrams depicting methods according to the fourth aspect of the disclosure, for implementing a simplified payment protocol for cryptocurrency payments to a payee client that is associated with the payment service, such as the bsvalias payment service as described in relation to the second and the third aspects.

FIG. 7*a* shows the method implemented by a one or more processors associated with the payment service for a payee entity, while FIG. 7*b* shows the method implemented by a one or more processors associated with the payment client entity, i.e. the payer entity in this case, which may be associated with a payment service that is the same as or different to the payment service for the payee entity.

In some embodiments, the simplified payment protocol of the fourth aspect is based on the payment destination associated with the alias as discussed in relation to FIGS. 5*a* and 5*b*. In some embodiments, a payment destination relates to an address that is to be encoded or included in an output script, so that a transaction may be constructed for the distributed ledger, i.e. blockchain, based on this address. In some embodiments, the payment destination is an endpoint identifier. In other embodiments, the payment destination endpoint identifier may be different to a public address associated with the alias or may be part of or associated with the public address for a digital wallet associated with the alias. In some embodiments, the public address and/or the payment destination endpoint identifier associated with the alias may be static or dynamically assigned. The embodiments of the fourth aspect as explained in related to FIGS. 7*a* and 7*b* may be implemented with digital wallets that are SPV wallets for the payee entity and/or the payer entity. However, this is not essential given that a payment service such as bsvalias, as set out in the above aspects, can be implemented for any type of computing device or wallet implementation.

In this present non limiting illustration of the fourth aspect for a payment transaction between two payment entities, following on from the above examples, let us assume that Alice (payer) wants to make a payment to Bob (payee), where both parties use the same type of SPV wallet. It is known that SPV wallet stores the user's private and public keys, unspent transactions and block headers. Such a wallet also has the ability to connect to a blockchain. The term "block header" is known in the art and is used to refer to data GBGB1902092.4, all filed on 5 Feb. 2019. The SPV wallet implementations in these applications may also be used to implement the fourth aspect of the present disclosure, but the present disclosure is not limited to the use of such SPV wallets.

The embodiments of the fourth aspect will now be discussed in relation to FIG. 7*a*, where the method is implemented by one or more processors associated with a payment service for payment client, in this case the payee entity.

Step 702*a* depicts receiving from a payer entity a payment indicator for a cryptocurrency payment associated with an alias for the payee client. Thus, following on from the examples in the earlier embodiments, this step involves getting a request from Alice to make a payment to Bob, where Alice indicates that a payment of cryptocurrency, i.e. 3 BSV, is to made to the alias that Alice is aware of for Bob, i.e. bob@nchain.com. In this case the alias includes the name "bob" and the network identifier "nchain". However, as mention in the above aspects, the name in the alias may also be or indicate the network identifier. The network identifier may be a tld, i.e. top-level domain name. This may be in the form of a message of notification sent or generated by the payer client upon intention to use or purchase , or upon such use of good or services provided by Bob. In this case, Bob can be considered to be a merchant and Alice, a customer.

In step 704*a*, upon receipt of the payment indicator, the payment service, which is bsvalias from the above discussed examples, accesses the machine-readable resource, i.e. the JSON document, to identify the capabilities available to Bob , i.e. the payee client, in respect of such payment. Assuming that bsvalias supports the above mentioned simplified payment protocol capability for the alias bob@nchain.com, such capability may be specified in the JSON document for bsvalias by:

```
{
  "bsvalias": "version 1.0",
  "capabilities": {
    "3b585cdaa4cd": "https://bsvalias.example.org/{name}@{domain.tld}/simplified payment protocol"
  }
}
``` provided at the top of a block of blockchain transactions. The block header uniquely identifies the block so it can be located on the blockchain. It comprises fields of data that provide a unique summary or fingerprint of the entire block's contents. The block header includes a Merkle Root, which is a hash of all of the transactions in that block. A user is then able to search a Merkle tree with that root to check (i.e. verify) whether a particular transaction was included in a particular block on the blockchain, without having to download the entire blockchain. An advantage of the SPV wallet is that it enables power and storage constrained devices such as phones and laptops to operate within a blockchain network because it only needs to check that a transaction has been verified (hence the name "simplified payment verification") rather than performing a full check of the blockchain as per other forms of digital wallets. Improved security solutions for verification on a blockchain network using a low bandwidth SPV system is described in detail in the following UK patent applications by the applicant nChain Holdings Limited: GB1902086.6, GB1902088.2, GB1902090.8, GB1902089.0 and The template values {name} and {domain.tld} refer to the components of the payee's alias, i.e. <name>@<domain>.<tld>. This is to be substituted by a user or another payment client before issuing a request in relation to this capability. 3b585cdaa4cd may in this example be the entry identifier that refers to the simplified payment capability in the machine-readable document.

In step 706*a*, once the capability of simplified payment protocol has been noted for the alias bob@nchain.com, the payment service for the payee client generates an output script for the payment to be made to Bob, based on the payment indicator received from Alice in step 702*a*. This output script is to be included in a payment request template, which can be straightaway sent to a payer client, i.e. Alice in this example.

In this step, the capability identified in step 704*a* as 3b585cdaa4cd, returns a path from the .well-known/bsvalias document, i.e. the machine-readable resource for bsvalias, in the form of a URI template, which is referred to herein as the payment request template. The output script will be associated with a payment destination endpoint for a payment as well as may indicate other metadata, such as expiration time/date etc. for the output script. The payment request template that is generated based on the output script may include the following example:

```
{
  "transactions": [
    {
      "version": 1,
      "locktime": 0,
      "vin": [
        {
          "txid":
"aa91522c9909a1c0d2635f30cb921b11af4f1b60c13dd4b74ae930d3093e0380",
          "vout": 74,
          "scriptSig":
"473044022044f24f032d218ce2eccd10ae1c9c8773be0c965ca0cff9ce3f17a19236b3474e
0220294624f19f70652d82edd30f104e7787f44aee0e0a4270f70a87bca18833c1c4412102
e6f260547b8bbf0254c35a2deada1d26b82262e0cb72d6bc8fe1abeca704f293",
          "sequence": 4294967295
        }
      ],
      "vout": [
        {
          "value": 4099986400,
          "n": 0,
          "scriptPubKey": "76a914ca2043b3f87971ccffe9ceaf821e3ae02f5fb0b488ac",
        },
        {
          "value": 10000012240,
          "n": 1,
          "scriptPubKey": "76a914ecc14556bd810ff874b00ac1e10cccb5cb986f1888ac"
        }
      ]
    }
  ]
}
```

In the above example, the use of the "transactions" array indicated that it is a transaction template or a pseudo transaction. In some embodiments this allows for batched submissions, i.e. adding to the blockchain, without multiple HTTP requests.

The txid, scriptSig and scriptPubKey fields all refer to hex-encoded raw Bitcoin binary, in this example. The example value fields are integers that represent satoshis. However, it will be understood that the present disclosure and its associated embodiments are not limited to Bitcoin or BSV or satoshis.

In step 708a, the payment request template along with the output scripts that are generated in steps 706a is directly sent to the payer entity by the payment service. In some embodiments, if the payer entity uses a payment service such as bsvalias, then the payment request template is sent to the alias for the payer entity, i.e. alice@nchain.com or alice@notchain.com.

In step 710a, a completed payment transaction based on the template in step 706a is received from the payee entity. This is received as a HTTPS POST request, similar to the request flow set out in relation to payment destination addressing in FIG. 6, where the alias, i.e. the name and network identifier, is added to the template along with the details of the crypto currency payment to be made. The received completed payment transaction is in a format that is ready to be submitted to the blockchain, as the output scripts are already included in the template. The received completed payment transaction is signed by the payer entity. This, in this step a digital signature associated with a public key for the payer entity may be verified, for instance using the HTTPS GET request relating to a PKI template as set out in FIG. 4.

In step 712a, the completed transaction from step 710a is submitted to the distributed ledger by the payee entity.

The method and embodiments of the fourth aspect advantageously enables the wallet, processor and/or computing devices associated with the payee entity to keep track of incoming transactions with much more ease, rather than scanning every transaction and every block in the blockchain, or relying on a bloom filtered connection to do the same. Thus, as the number of incoming payments and transaction increase for a node, i.e. the payee entity Bob in this example, the present embodiments ensure that all and any amount of such transactions can be tracked easily, thereby ensuring reliability and scalability for blockchain based payment services.

The present aspect also increases the security for payment transactions made for the payee client, the digital signature of a payer has to be verified before submitting it to the blockchain, which is an added security measure. The payment service for the payee client may choose to reject signed transactions that do not pay to the keys associated with the alias in the payment request template. When rejecting requests, the payment service may choose any HTTP status code they like 401 (Unauthorsied) 204 (No Content) or 404(Not Found)

FIG. 7b relates to steps corresponding to FIG. 7a but implemented on the payer or requesting entity's computing device or digital wallet.

Step 702b relates to generating a payment indicator for a cryptocurrency payment associated with an alias pertaining to a payee client, where the payee client is associated with a payment service. Following on from the explanation in step 702a, in the illustrated non limiting embodiment, the payee's alias is bob@nchain.com and the payment service is bsvalias. As mentioned above, the indicator may be automatically generated or may be a message or notification sent from the payer entity, i.e. Alice, that a payment of BSV should be made to Bob. In some embodiments, as the payer Alice is only aware of Bob's alias, i.e. bob@nchain.com, the payment indicator may be sent using the HTTPs GET request as set out in relation to FIG. 4, but this is not necessary.

In step 704*b*, a payment request template is received from the payment service associated with the payee client. As mentioned above in step 704*a*, the payment request template includes all details and the output script for a blockchain transaction to make a payment to the payee entity.

In step 706*b*, one or more processors associated with the payer entity or its wallet generates a completed payment transaction based on the obtained payment request template by including the alias and the associated network identifier in the template, i.e. replacing the template values {name} and {domain.tld} to refer to the components of the payee's alias , i.e. <name>@<domain>.<tld>in the URI received from the payee entity. In addition, the payment details including the amount of cryptocurrency is added to complete the transaction template from the payee entity.

In step 708*b* a digital signature associated with a public key of a payer entity is applied, to sign the complete payment transaction. As mentioned in respect of step 710*a*, this is so that the identity of the payer identity may be verified.

In step 710*b*, the completed and signed payment transaction is sent to the payee entity associated with the alias, based on the output script in the template that was received in step 704*b*. This is provided as a HTTPS POST request after substituting the alias of the payee, as indicated in step 710*a*. In some embodiments, once the completed payment transaction is sent, an acknowledgement of the cryptocurrency payment from the payment service associated with the payee entity may be received by the payer entity. This may be used to keep track of or monitor payments associated with the payer entity, i.e. Alice.

Figure 8:
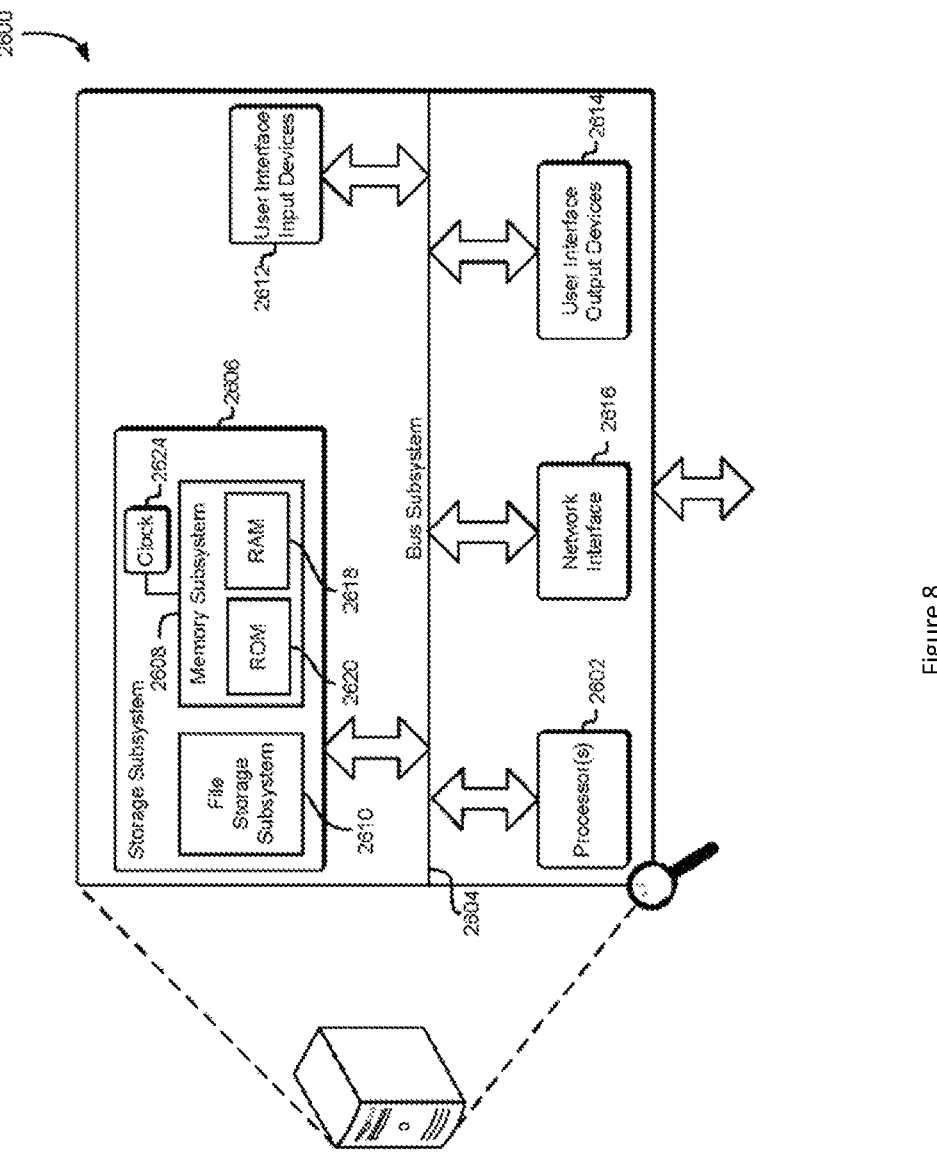
FIG. 8 is a schematic diagram illustrates a computing environment in which various embodiments can be implemented.

Turning now to FIG. 8, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a web server or one or more processors or computing devices associated with a payment service or a payment client entity, i.e. to implement a host responsible for provision of the payment service, or to implement a payer or payee payment client entity. Thus computing device 2600 may be a portable computing device, a personal computer, or any electronic computing device. As shown in FIG. 8, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 8 is intended only as a specific example for purposes of illustrating the preferred embodiment of the device. Many other configurations having more or fewer components than the system depicted in FIG. 8 are possible.

Enumerated Example Embodiments

1. A computer implemented method of implementing a payment service for a one or more clients for transactions associated with a distributed ledger, the method comprising the steps of:

providing an alias for a given client among the one or more clients, the alias being specific to the given client, the alias including or related to a network identifier;

associating the alias with the network identifier in a directory, the step of associating including:

creating a service record based on the network identifier in the directory;

updating the service record to indicate that the payment service is provided by a network or domain associated with the network identifier; and updating the service record to indicate a location for a host computing resource responsible for the payment service, wherein the host computing resource is configured to facilitate identification of the digital wallet associated with the alias, responsive to a request pertaining to a transaction related to the alias.

2. The method as set out in clause 1, wherein each client of the one or more clients are associated with a digital wallet.

3. The method as set out in clause 1 or clause 2 comprising:

responsive to a request from a requesting entity pertaining to a transaction associated with the alias, performing a search of the directory based on the alias;

identifying the service record for the payment service in the directory that relates to the network identifier; and returning the location of the host computing resource for the payment service wherein, a public address of the client associated with the alias is determined based on the returned location, the public address for use in the transaction.

4. A method associated with a transaction for a distributed ledger, wherein an alias is provided for a given client among one or more clients, the alias being specific to the given client, the alias including or related to a network identifier, the method comprising the steps of:

sending from a requesting entity a request pertaining to a transaction, the request associated with the alias;

obtaining the location of a host computing resource associated with a payment service, the location being based on a service record related to the network identifier that is identified in a search of a directory; and wherein a public address of the client associated with the alias is determined based on the location, the public address for use in the transaction.

5. The method as set out in clause 4 wherein each client of the one or more clients is associated with a digital wallet.

6. The method as set out in any one of clauses 3 to 5 , wherein the step of returning or obtaining the location of the host computing resource includes returning or obtaining a target and port pair, wherein the target includes an identifier of the host computing resource, and wherein the port includes an identifier for an Internet protocol communication port used by the payment service.

7. The method as set out in any preceding clause, wherein the host computing resource is associated with a payment network that is different to the network associated with network identifier of the alias, and wherein the payment service for one or more entities registered with the network is delegated to a payment domain associated with the payment network.

8. The method as set out in clauses 1 to 7 wherein the host computing resource is associated with a payment network, and wherein the domain of the payment network is the same as the domain of the network associated with the network identifier of the alias.

9. A computer implemented method of implementing a payment service for one or more clients for transactions associated with a distributed ledger, the method comprising: creating a machine readable resource associated with the payment service, wherein the machine readable resource comprises:

at least one endpoint identifier associated with a host computing resource responsible for implementing the payment service for each client, each client being associated with an alias, the alias including or related to a network identifier;

an entry associated with at least one capability among a plurality of capabilities supported by the payment service, instructions and/or a specification for accessing or obtaining a public address associated with the alias, the public address used for facilitating transactions associated with the alias; and providing the machine readable resource at a predictable or known location associated with the payment service.

10. The method as set out in clause 9 wherein each client of the one or more clients is associated with a digital wallet.

11. The method as set out in clause 9 or 10 wherein the plurality of capabilities include one or more of:

payer entity or payee entity validation, multiple digital signatures for transactions, payee entity approval for transactions, email-protocol related payment transactions, simplified payment protocol or flow for payment transactions, and/or call-back requests or responses.

12. The method as set out in any one of clauses 9 to 11 further including the step of determining a location for the host computing resource by the method according to any one of clauses 1 to 3 and 6 to 8, wherein the endpoint identifier in the machine readable resource is based on the determined location.

13. The method as set out in any one of clauses 9 to 12 wherein, responsive to a request from a requesting entity pertaining to a transaction associated with an alias, the method further comprises steps of:

based on the network identifier associated with the alias in the request, identifying the payment service associated with the alias;

based on the identified payment service, accessing the machine readable resource from the predictable or known location;

responsive to identifying if one or more capabilities required for the transaction are present in the machine readable resource, returning an endpoint identifier of the host computing resource for the payment service from the machine readable resource; and obtaining a public address associated with the alias based on one or more of the instructions and/or specification in the machine readable resource.

14. A method associated with a transaction for a distributed ledger, wherein an alias is provided for a given client among one or more clients, the alias being specific to the given client, the alias including or related to a network identifier, the method comprising the steps of:

sending from a requesting entity a request pertaining to a transaction, the request associated with the alias;

accessing the machine readable resource from a location associated with the payment service, wherein the payment service is identified based on the network identifier in the alias, and wherein the machine readable resource is created according to clause 9;

based on identifying if one or more capabilities required for the transaction are present in the machine readable resource, receiving an endpoint identifier of the host computing resource for the payment service associated with the alias; and obtaining a public address associated with the alias using one or more of the instructions and/or specification in the machine readable resource.

15. The method as set out in any one of clauses 13 or 14, wherein each client is associated with a digital wallet pertaining to a user or entity registered for the payment service in the network, wherein each digital wallet is a cryptocurrency wallet associated with a public key and a private key of an asymmetric cryptography key pair for transactions on the distributed ledger, and wherein the step of obtaining the public address includes obtaining the public key of the digital wallet associated with the alias.

16. The method as set out in clause 15, wherein the public address associated with the alias is based on a cryptographic hash of the public key of the digital wallet associated with the alias.

17. The method as set out in any one of clauses 15 or 16, wherein the public key of the digital wallet is an elliptic curve digital signature algorithm (ECDSA) public key, wherein the public key is not part of any transaction previously stored on or posted to the distributed ledger.

18. The method as set out in any one of clauses 13 to 17, wherein the one or more instructions and/or specification in the machine readable resource comprises:

obtaining a public key infrastructure (PKI) request template from the machine readable resource for a PKI endpoint identifier;

including the alias and the network identifier in the template to generate a complete PKI request; and sending a HTTP GET request based on the complete PKI request to obtain a public key associated the alias.

19. The method as set out in any of clauses 9 to 18 wherein the known or predictable location of the machine readable resource is based on at least one of the endpoint identifier, an Internet protocol communication port used by the payment service and/or a configuration specification of the payment service included in a publically accessible well-known domain repository.

20. The method as set out in any one of clauses 9 to 19 wherein the machine readable resource is generated using a Java Script Object Notation (JSON) format.

21. The method as set out in any one of clauses 13 and 15 to 20, wherein the step of obtaining the public address associated with the alias includes obtaining a payment destination of a payee entity associated with an alias, the payment destination for use in constructing a transaction for making a cryptocurrency payment from a payer entity to the alias, the method comprises the steps of:

accessing the machine-readable resource for the payment service;

returning a payment destination endpoint identifier based on the one or more instructions and/or specification in the machine readable document;

obtaining payment details for the transaction from the payer entity, the payment details including an alias associated with the payee entity client and an amount of cryptocurrency to be paid to the payee entity;

obtaining a digital signature for associating the payment details with a cryptographic key associated with the payer entity; and generating an output script associated with the payment destination endpoint identifier associated with the alias, the output script provided for embedding in a transaction for the distributed ledger.

22. The method as set out in any one of clauses 14 to 20 , wherein the step of obtaining the public address associated with the alias includes obtaining a payment destination of a payee entity associated with the alias, the payment destination for use in constructing a transaction for making a cryptocurrency payment from a payer entity to the alias, wherein the step of constructing the transaction comprises:

sending from the payer entity a request pertaining to the transaction, the request associated with the alias;

accessing the machine readable resource from a location associated with the payment service;

receiving a payment destination endpoint identifier based on the one or more instructions and/or specification in the machine readable document;

providing payment details for the transaction, the payment details including an alias associated with the payee entity client and an amount of cryptocurrency to be paid to the payee entity;

providing a digital signature for associating the payment details with a cryptographic key;

receiving an output script associated with the payment destination endpoint identifier associated with the alias; and creating the transaction by embedding the received output script in a transaction for the distributed ledger.

23. The method as set out in clauses 21 or 22, wherein the one or more instructions and/or specification in the machine readable resource comprises:

obtaining a payment destination request template from the machine readable resource for a payment destination endpoint identifier;

including the alias and the network identifier in the template to generate a complete payment destination request; and sending a HTTP POST request based on the complete payment destination request to obtain the payment destination endpoint identifier associated with the alias.

24. The method as set out in any one of clauses 21 to 23, wherein the public addresses of the alias and the payer entity each include a public key of the respective digital wallet associated with the payee entity and the payee entity, and wherein the digital signature is used for verifying the identity of the payer entity.

25. The method as set out in any one of clauses 21 to 24 wherein digital signatures associated with both, the payer entity and the payee entity are required for verification of each respective entity, before the created transaction is stored or posted on the distributed ledger.

26. A computer implemented method of implementing a payment service for one or more clients for transactions associated with a distributed ledger, the method comprising:

updating a machine-readable resource associated with the payment service, the machine-readable resource being provided at or accessible from a predictable or known location associated with the payment service, the machine-readable resource created according to clause 9, the step of updating comprising:

adding at least one further capability that is supported by the payment service, wherein the at least one further capability includes implementing a simplified protocol for processing a digital asset for a given client among the one or more clients.

27. A computer implemented method of implementing a payment service for transactions associated with a distributed ledger, wherein an alias is provided for a client among one or more clients associated with the payment service, the alias being specific to the client, each client being provided with a respective alias, the method comprising the steps of:

receiving from a payer entity a payment indicator for a cryptocurrency payment associated with an alias, the indicator pertaining to a payee entity among the one or more clients associated with the payment service, the payee entity being associated with the alias in the payment indicator;

providing a payment request template based on a machine-readable resource according to clause 9, the machine readable resource associated with the payment service, the payment request template including an output script for the payee entity;

receiving a completed payment transaction based on the payment template from the payer entity, the completed payment transaction associated with the alias and the network identifier;

providing the completed payment transaction to the distributed ledger.

28. The method as set out in clause 27 wherein the payment service of the payee entity is implemented by the method as set out in clause 26, and wherein the at least one capability supported by the payment service of the payee entity is based on the at least one further capability in the updated machine readable resource of clause 26.

29. The method as set out in any one of clauses 27 or 28, wherein the output script in the payment request template includes a payment destination, for use in constructing a transaction for a cryptocurrency payment from a payer entity to the alias, the output script provided by the steps of:

accessing the machine-readable resource for the payment service;

obtaining a payment destination endpoint identifier based on the one or more instructions and/or specification in the machine-readable document; and generating the output script associated with the payment destination endpoint identifier for the payee entity to which the alias pertains.

30. The method as set out in any one of clauses 27 or 29 comprising the steps of:

receiving the completed payment transaction in the form of a HTTPS POST request from the payer entity, the completed payment transaction including:

payment details for the payment transaction from the payer entity, the payment details including the alias associated with the payee entity and an amount of cryptocurrency to be sent to the payee entity, and a digital signature for associating the payment details with a cryptographic key pertaining to the payer entity; and submitting the completed payment transaction to the distributed ledger.

31. The method as set out in clause 30 comprising the step of sending an acknowledgement to the payer entity response to receipt of the completed payment transaction.

32. A computer implemented method associated with a transaction for a distributed ledger, wherein an alias is provided for a client among one or more clients associated with a payment service, the alias being specific to the client, each client being associated with a respective alias, the method comprising the steps of:

generating a payment indicator for a cryptocurrency payment associated with an alias pertaining to a payee entity among the one or more clients associated with the payment service;

sending the payment indicator to the alias based on one or more instructions and/or specification in a machine-readable resource as set out in clause 9, the machine-readable resource associated with the payment service for the alias;

obtaining a payment request template from the payment service pertaining to the alias, the payment request template including an output script for the payee entity;

generating a completed payment transaction based on the obtained payment request template by the steps of:

including the alias and the network identifier of the payee entity in the template; applying a digital signature associated with a public key of a payer entity to sign the payment transaction; and providing payment including the amount of cryptocurrency to be paid to the alias; and sending the completed payment transaction to the payee entity associated with the alias.

33. The method as set out in clause 1 comprising the step of receiving an acknowledgement of the cryptocurrency payment from the payment service associated with the payee entity.

34. The method as set out in any preceding clause wherein the alias is a payment handle associated with a client.

35. A method for configuring a prefix for making a request pertaining to a transaction from a requesting entity to an alias associated with a client, the method comprising, responsive to receipt of a request from the requesting entity that includes the prefix and the alias, triggering the steps of any one of the preceding clauses based on the alias.

36. A computing device or a computer system, comprising:

a processor; and memory including executable instructions that, as a result of execution by the processor, causes the system to perform the computer-implemented method of any preceding clauses.

37. A non-transitory computer-readable storage medium having stored thereon executable instructions that, as a result of being executed by a processor of a computer system, cause the computer system to perform the computer-implemented method of any one of clauses 1 to 35.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer implemented method of implementing a payment service for one or more clients for transactions associated with a distributed ledger, the method comprising:

creating a machine readable resource associated with the payment service, wherein the machine readable resource comprises:

at least one endpoint identifier associated with a host computing resource responsible for implementing the payment service for each client, each client being associated with an alias, the alias including or related to a network identifier to provide alias-based addressing enabling dynamic key management at a network identifier level by allowing public key updates and replacements through the machine readable resource;

an entry associated with at least one capability among a plurality of capabilities supported by the payment service, wherein the at least one capability includes a simplified payment protocol capability, wherein:

the at least one capability includes payer entity validation, multiple digital signatures for transactions, and payee entity approval requirements that must be satisfied before any transaction is processed; and the at least one capability further includes a payment request template that encapsulates a generated output script for a payment associated with the alias, wherein the output script is dynamically generated based on current key information obtained through the alias-based addressing; and instructions and/or a specification for accessing or obtaining a public address associated with the alias, wherein the instructions specify obtaining a public key infrastructure (PKI) request template and generating a complete PKI request by including the alias and network identifier in the template to obtain a public key associated with the alias, the public address used for facilitating transactions associated with the alias; and providing the machine readable resource at a predictable or known location associated with the payment service as defined by a Uniform Resource Identifier (URI);

accessing the machine readable resource to identify the simplified payment protocol capability for the alias;

generating, by the host computing resource and based on the simplified payment protocol capability, an output script for a payment associated with the alias;

encapsulating, by the host computing resource, the output script in the payment request template according to the instructions in the machine readable resource, wherein the payment request template includes details of required payment amount, a list of outputs, expiration data and metadata needed for the payment;

generating, by the host computing resource, an issuer signature using a private key present on the host computing resource, wherein the issuer signature is a unique session key identifiable only between the host computing resource and a payer entity;

encrypting, by the host computing resource, the payment request template including the encapsulated output script using the issuer signature;

transmitting the encrypted payment request template with the encapsulated output script from the host computing resource to the payer entity based on the simplified payment protocol capability;

receiving a completed payment transaction from the payer entity based on the transmitted payment request template; and verifying the completed payment transaction using verified digital signatures from the payer entity and the payee entity according to the instructions in the machine readable resource prior to submitting to the distributed ledger.

2. The method as claimed in claim 1, wherein each client of the one or more clients is associated with a digital wallet.

3. The method as claimed in claim 1, wherein the plurality of capabilities includes one or more of:

payer entity or payee entity validation;
multiple digital signatures for transactions;
payee entity approval for transactions;
email-protocol related payment transactions;
simplified payment protocol or flow for payment transactions; and/or call-back requests or responses.

4. The method as claimed in claim 2, further including the step of determining a location for the host computing resource by the method of implementing a payment service for one or more clients for transactions associated with a distributed ledger, the method comprising the steps of:

providing an alias for a given client among the one or more clients, the alias being specific to the given client, the alias including or related to a network identifier;

associating the alias with the network identifier in a directory, the step of associating including:

creating a service record based on the network identifier in the directory; updating the service record to indicate that the payment service is provided by a network or domain associated with the network identifier; and updating the service record to indicate a location for a host computing resource responsible for the payment service, wherein the host computing resource is configured to facilitate identification of the digital wallet associated with the alias, responsive to a request pertaining to a transaction related to the alias; and wherein the endpoint identifier in the machine readable resource is based on the determined location.

5. The method as claimed in claim 1, wherein, responsive to a request from a requesting entity pertaining to a transaction associated with an alias, the method further comprises steps of:

based on the network identifier associated with the alias in the request, identifying the payment service associated with the alias;

based on the identified payment service, accessing the machine readable resource from the predictable or known location;

responsive to identifying if one or more capabilities required for the transaction are present in the machine readable resource, returning an endpoint identifier of the host computing resource for the payment service from the machine readable resource; and obtaining a public address associated with the alias based on one or more of the instructions and/or specification in the machine readable resource.

6. The method associated with a transaction for a distributed ledger, wherein an alias is provided for a given client among one or more clients, the alias being specific to the given client, the alias including or related to a network identifier, the method comprising the steps of:

sending from a requesting entity a request pertaining to a transaction, the request associated with the alias;

accessing the machine readable resource from a location associated with the payment service, wherein the payment service is identified based on the network identifier in the alias, and wherein the machine readable resource is created according to claim 1;

based on identifying if one or more capabilities required for the transaction are present in the machine readable resource, receiving an endpoint identifier of the host computing resource for the payment service associated with the alias; and obtaining a public address associated with the alias using one or more of the instructions and/or specification in the machine readable resource.

7. The method as claimed in claim 5, wherein each client is associated with a digital wallet pertaining to a user or entity registered for the payment service in the network, wherein each digital wallet is a cryptocurrency wallet associated with a public key and a private key of an asymmetric cryptography key pair for transactions on the distributed ledger, and wherein the step of obtaining the public address includes obtaining the public key of the digital wallet associated with the alias.

8. The method as claimed in claim 7, wherein the public address associated with the alias is based on a cryptographic hash of the public key of the digital wallet associated with the alias.

9. The method as claimed in claim 7, wherein the public key of the digital wallet is an elliptic curve digital signature algorithm (ECDSA) public key, wherein the public key is not part of any transaction previously stored on or posted to the distributed ledger.

10. The method as claimed in claim 5, wherein the one or more instructions and/or specification in the machine readable resource comprises:

obtaining a public key infrastructure (PKI) request template from the machine readable resource for a PKI endpoint identifier;

including the alias and the network identifier in the template to generate a complete PKI request; and sending an HTTP GET request based on the complete PKI request to obtain a public key associated with the alias.

11. The method as claimed in claim 1, wherein the known or predictable location of the machine readable resource is based on at least one of:

the endpoint identifier, an Internet protocol communication port used by the payment service, and/or a configuration specification of the payment service included in a publicly accessible well-known domain repository.

12. The method as claimed in claim 1, wherein the machine readable resource is generated using a Java Script Object Notation (JSON) format.

13. The method as claimed in claim 5, wherein the step of obtaining the public address associated with the alias includes obtaining a payment destination of a payee entity associated with an alias, the payment destination for use in constructing a transaction for making a cryptocurrency payment from a payer entity to the alias, the method comprises the steps of:

accessing the machine readable resource for the payment service;

returning a payment destination endpoint identifier based on the one or more instructions and/or specification in the machine readable resource;

obtaining payment details for the transaction from the payer entity, the payment details including an alias associated with the payee entity client and an amount of cryptocurrency to be paid to the payee entity;

obtaining a digital signature for associating the payment details with a cryptographic key associated with the payer entity; and generating an output script associated with the payment destination endpoint identifier associated with the alias, the output script provided for embedding in a transaction for the distributed ledger.

14. The method as claimed in claim 6, wherein the step of obtaining the public address associated with the alias includes obtaining a payment destination of a payee entity associated with the alias, the payment destination for use in constructing a transaction for making a cryptocurrency payment from a payer entity to the alias, wherein the step of constructing the transaction comprises:

sending from the payer entity a request pertaining to the transaction, the request associated with the alias;

accessing the machine readable resource from a location associated with the payment service;

receiving a payment destination endpoint identifier based on the one or more instructions and/or specification in the machine readable resource;

providing payment details for the transaction, the payment details including an alias associated with the payee entity client and an amount of cryptocurrency to be paid to the payee entity;

providing a digital signature for associating the payment details with a cryptographic key;

receiving an output script associated with the payment destination endpoint identifier associated with the alias; and creating the transaction by embedding the received output script in a transaction for the distributed ledger.

15. The method as claimed in claim 13, wherein the one or more instructions and/or specification in the machine readable resource comprises:

obtaining a payment destination request template from the machine readable resource for a payment destination endpoint identifier;

including the alias and the network identifier in the template to generate a complete payment destination request; and sending a HTTP POST request based on the complete payment destination request to obtain the payment destination endpoint identifier associated with the alias.

16. The method as claimed in claim 13, wherein the public addresses of the alias and the payer entity each include a public key of a respective digital wallet associated with the payee entity and the payee entity, and wherein the digital signature is used for verifying an identity of the payer entity.

17. The method as claimed in claim 13, wherein digital signatures associated with both, the payer entity and the payee entity are required for verification of each respective entity, before the created transaction is stored or posted on the distributed ledger.

18. A computer implemented method of implementing a payment service for one or more clients for transactions associated with a distributed ledger, the method comprising:

updating a machine readable resource associated with the payment service, the machine readable resource being provided at or accessible from a predictable or known location associated with the payment service, the machine readable resource created according to claim 1, the step of updating comprising:

adding at least one further capability that is supported by the payment service, wherein the at least one further capability includes implementing a simplified protocol for processing a digital asset for a given client among the one or more clients.

\* \* \* \* \*